United States Patent [19]

Tsuboyama et al.

[11] Patent Number: 5,013,137
[45] Date of Patent: May 7, 1991

[54] FERROELECTRIC LIQUID CRYSTAL DEVICE HAVING INCREASED TILT ANGLE

[75] Inventors: Akira Tsuboyama, Tokyo; Yutaka Inaba, Kawaguchi; Hiroyuki Kitayama, Tokyo; Shinjiro Okada, Kawasaki; Osamu Taniguchi, Kawasaki; Hideyuki Kawagishi, Tokyo; Yukio Hanyu, Yokohama, all of Japan

[73] Assignee: Canon Kabushiki Kaisha, Tokyo, Japan

[21] Appl. No.: 309,034

[22] Filed: Feb. 2, 1989

Related U.S. Application Data

[63] Continuation of Ser. No. 900,882, Aug. 27, 1986, abandoned.

[30] Foreign Application Priority Data

| Sep. 4, 1985 | [JP] | Japan | 60-193832 |
| Oct. 3, 1985 | [JP] | Japan | 60-220755 |
| Dec. 6, 1985 | [JP] | Japan | 60-273408 |
| Dec. 7, 1985 | [JP] | Japan | 60-274328 |
| Jul. 2, 1986 | [JP] | Japan | 61-155817 |
| Aug. 12, 1986 | [JP] | Japan | 61-187676 |

[51] Int. Cl.$^5$ .............................................. G02F 1/13
[52] U.S. Cl. .................... 350/333; 350/350 S; 350/341; 340/784
[58] Field of Search .................. 350/350 S, 332, 333, 350/341, 339 R; 340/784, 805, 811

[56] References Cited

U.S. PATENT DOCUMENTS

| 4,472,026 | 9/1984 | Boyd et al. | 350/341 |
| 4,556,880 | 12/1985 | Hamada | 340/784 |
| 4,561,726 | 12/1985 | Goodby et al. | 350/341 |
| 4,563,059 | 1/1986 | Clark et al. | 350/330 |
| 4,615,919 | 10/1986 | Inoue et al. | 350/341 |
| 4,638,310 | 1/1987 | Ayliffe | 350/350 S |
| 4,639,089 | 1/1987 | Okada et al. | 350/341 |
| 4,668,051 | 5/1987 | Mourey et al. | 350/350 S |
| 4,673,256 | 6/1987 | Hehlen et al. | 350/333 |
| 4,692,799 | 9/1987 | Ando et al. | 350/330 |
| 4,712,873 | 12/1987 | Kanbe | 350/350 S |
| 4,778,259 | 10/1988 | Kitayama et al. | 350/350 S |
| 4,867,539 | 9/1989 | Goodby et al. | 350/350 S |
| 4,898,456 | 2/1990 | Okada et al. | 350/350 S |

FOREIGN PATENT DOCUMENTS

| 0176623 | 10/1983 | Japan | 350/350 S |
| 0123825 | 7/1985 | Japan | 350/350 S |
| 0220316 | 11/1985 | Japan | 350/346 |

OTHER PUBLICATIONS

Clark et al.—"Fast and Bistable Electro-Optic Displays using FLC", Eurodisplay—1984—p. 73-76.
Yoshino et al.—"Electro-Optical Effect in Ferroelectric Smectic L.C.", Japan J. Applied Physics—vol. 17—No. 3—1978—pp. 597-598.
T. Harada—"An application of Chiral Smectic . . . Large Area Display", pp. 131-134—SID 85 Digest—XVI—1985.
J. M. Geary—"A multipleted Ferroelectric LCD . . . AC Field-Stabilized States", pp. 128-130—SID 85 Digest—1985, May.
IEEE Standard Dictionary of Electrical and Electronics Terms, 3rd Ed., p. 1026.

Primary Examiner—Stanley D. Miller
Assistant Examiner—Tai V. Duong
Attorney, Agent, or Firm—Fitzpatrick, Cella, Harper & Scinto

[57] ABSTRACT

A ferroelectric liquid crystal device comprising a pair of substrates each provided with an electrode thereon, and a ferroelectric liquid crystal layer disposed between the substrates in a thickness which is thin enough to release the spiral structure of the ferroelectric liquid crystal, wherein the ferroelectric liquid crystal provides two average molecular axis directions forming an angle $2\theta$ therebetween, each average molecular axis direction corresponding to one or two stable orientation states of the ferroelectric liquid crystal, the ferroelectric liquid crystal provides two average molecular axis directions forming an angle 2 H therebetween when voltages exceeding the threshold voltage of the ferroelectric liquid crystal are applied to the ferroelectric liquid crystal, and the ferroelectric liquid crystal provides two average molecular directions forming an angle $2\theta a$ therebetween after applying an alternating electric field to the ferroelectric liquid crystal and removing the electric field, the angles $\theta$, H and $\theta a$ satisfying the relationships of: $\theta < \theta a \leq$ H .

29 Claims, 19 Drawing Sheets

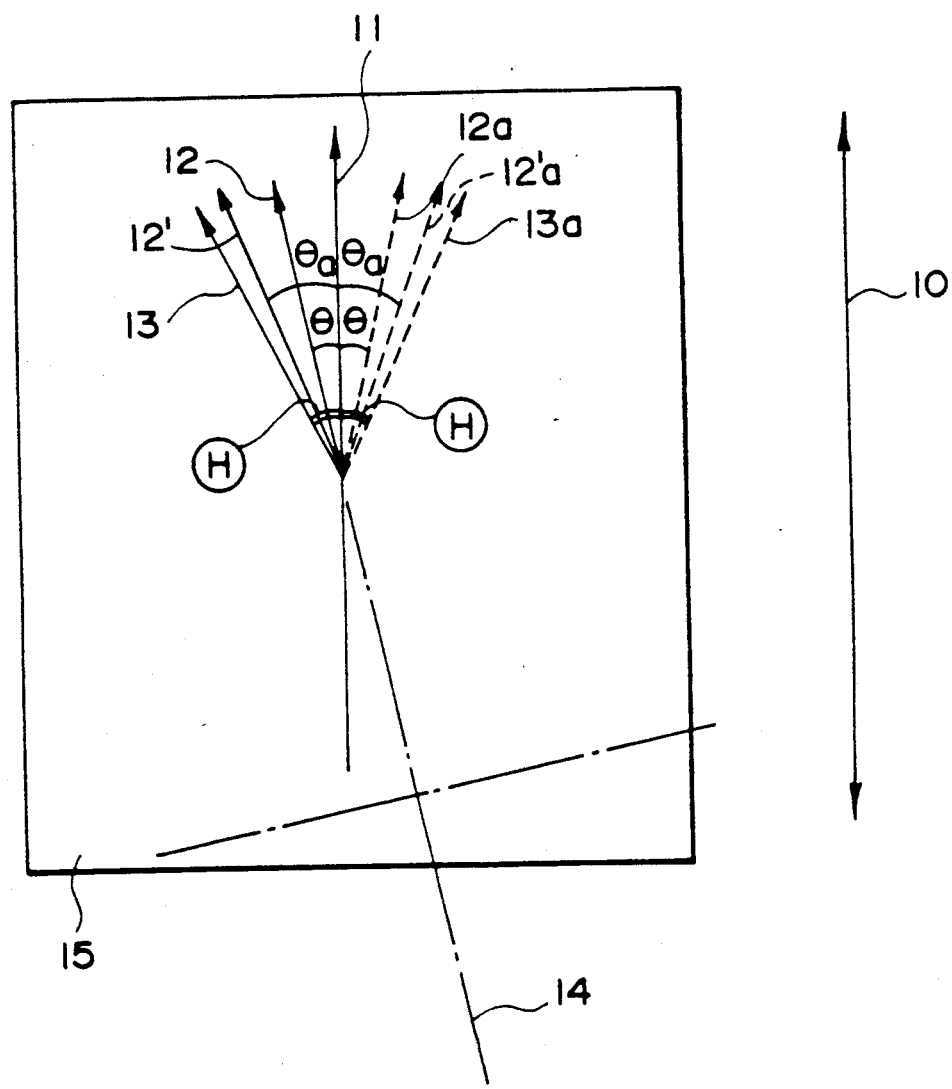
F I G. 1

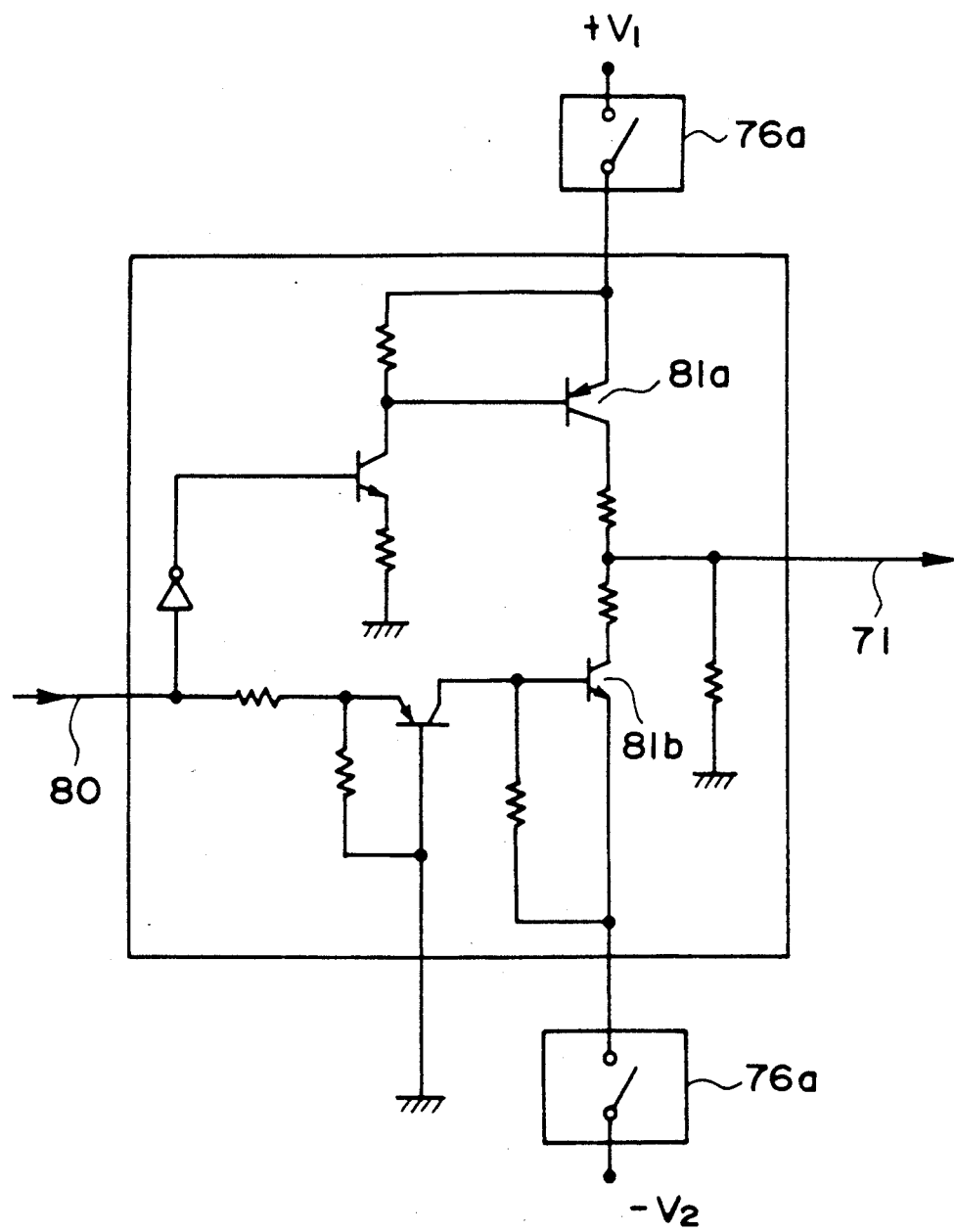
F I G. 8

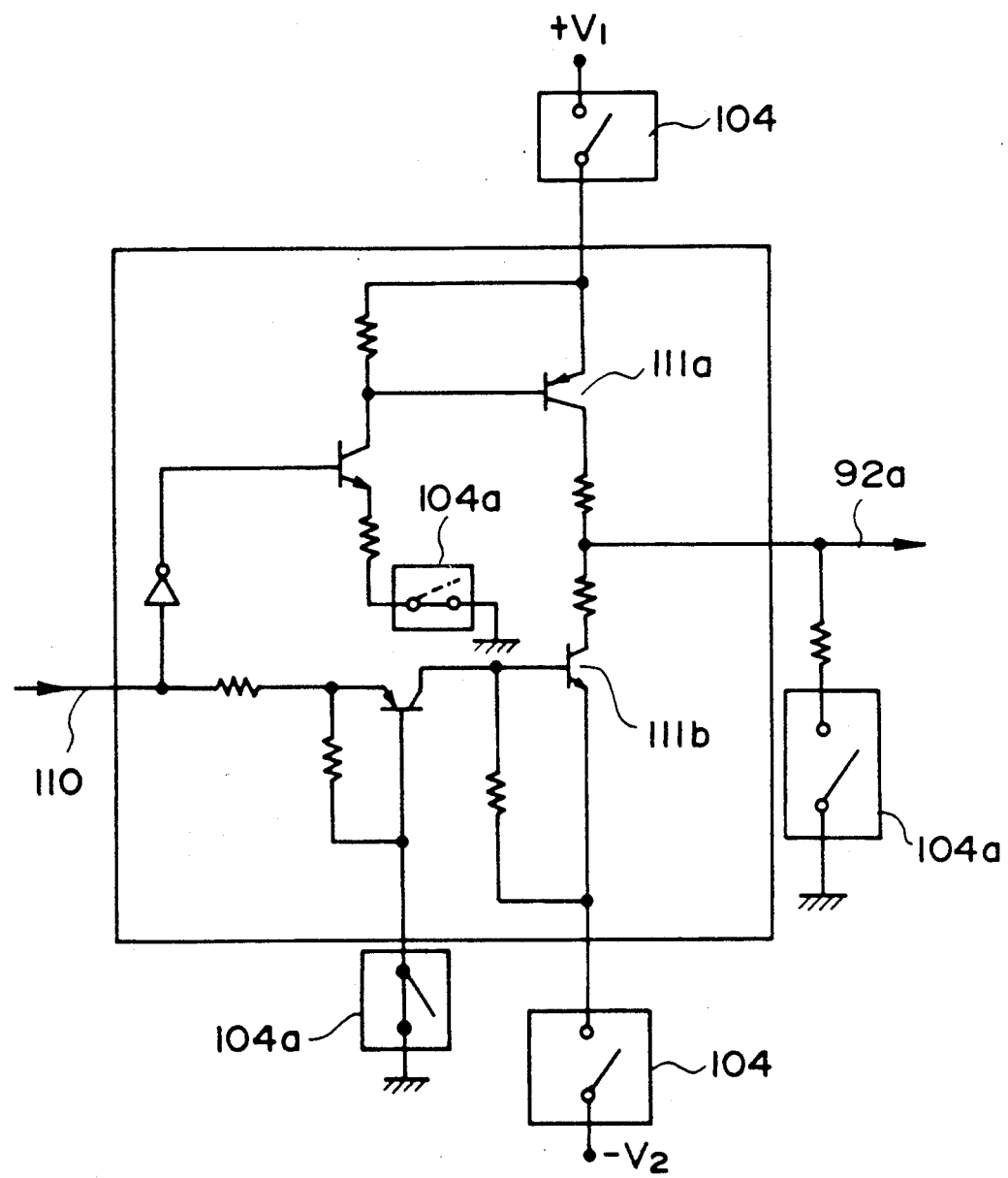
F I G. 11

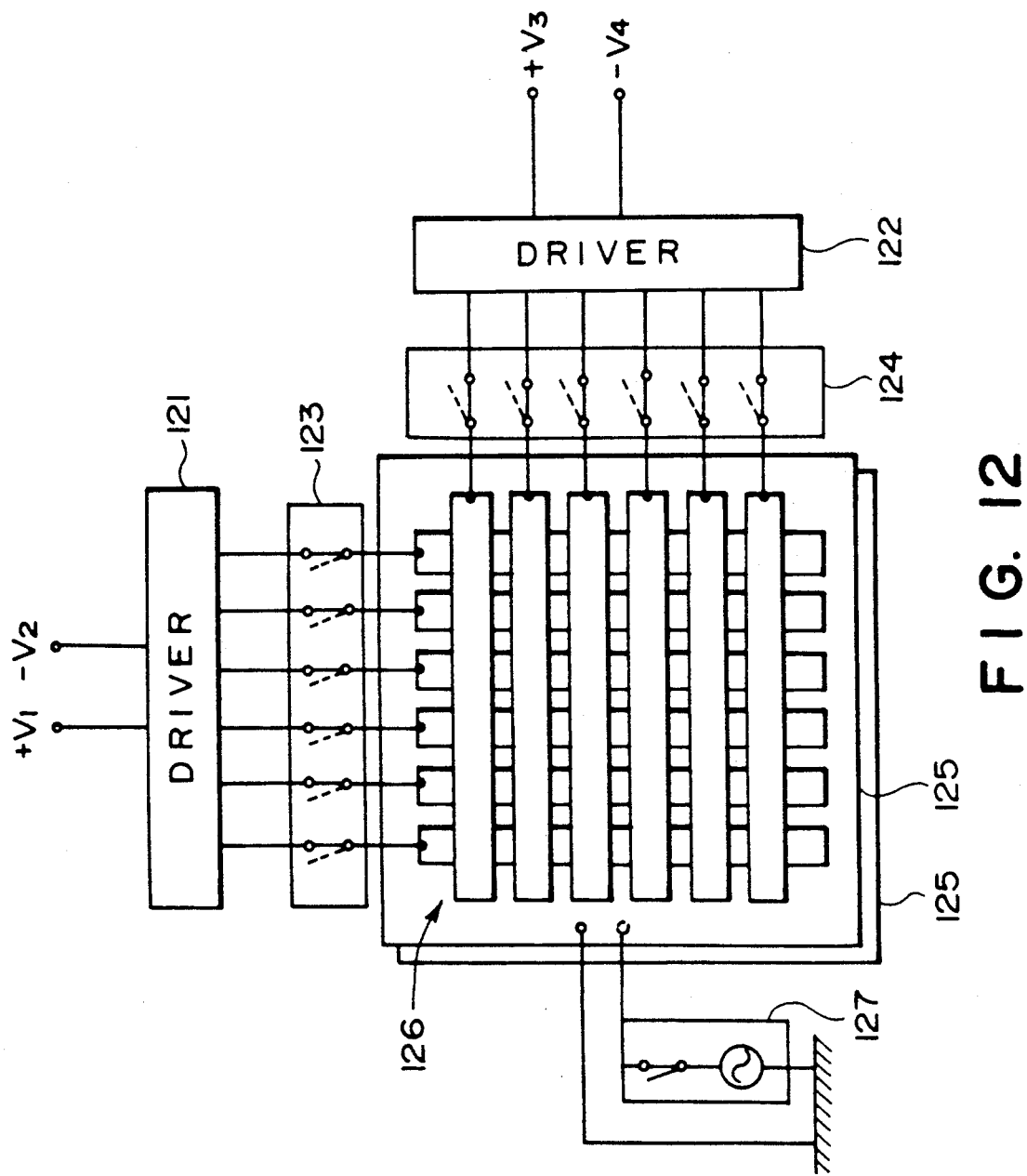
F I G. 12

FERROELECTRIC LIQUID CRYSTAL DEVICE HAVING INCREASED TILT ANGLE

This application is a continuation of application Ser. No. 900,882 filed Aug. 27, 1986, now abandoned.

BACKGROUND OF THE INVENTION

The present invention relates to a liquid crystal device for use in a liquid crystal display device, an optical shutter array, etc., and more particularly to a ferroelectric liquid crystal device having improved display and driving characteristics, because of improved initial alignment or orientation of liquid crystal molecules.

Clark and Lagerwall have proposed the use of a liquid crystal device having bistability (Japanese Laid-Open Patent Application No. 107216/1981, U.S. Pat. No. 4,367,924, etc.). As the bistable liquid crystal, a ferroelectric liquid crystal having chiral smectic C (SmC*) phase or H (SmH*) phase is generally used. The ferroelectric liquid crystal has bistability, i.e., has two stable states comprising a first stable state and a second stable state, with respect to an electric field applied thereto. Accordingly, different from the conventional TN-type liquid crystal in the above-mentioned device, the liquid crystal is oriented to the first stable state in response to one electric field vector and to the second stable state in response to the other electric field vector. Further, this type of liquid crystal very quickly assumes either one of the above-mentioned two stable states in reply to an electric field applied thereto and retains the state in the absence of an electric field. By utilizing these properties, essential improvements can be attained with respect to the above-mentioned difficulties involved in the conventional TN-type liquid crystal device.

In order to provide a uniform orientation or alignment characteristic to a ferroelectric liquid crystal in the above described type of device, there has been known to apply a uniaxial alignment treatment onto a substrate surface. More specifically, the uniaxial alignment treatment includes a method of rubbing a substrate surface with velvet, cloth or paper in one direction, or a method of obliquely depositing SiO or $SiO_2$ on a substrate surface.

By applying an appropriate uniaxial alignment treatment to a substrate surface, a specific bistable condition has been provided as an initial alignment characteristic. Under such an initial alignment condition, however, there have been observed practical problems such as poor contrasts and low light-transmittances during optical modulation tests carried out by using polarizers arranged in cross nicols in combination with the device.

More specifically, in a ferroelectric liquid crystal device of the type described above, a state wherein molecules of a liquid crystal (hereinafter sometimes abbreviated as "LC") are twisted from an upper substrate to a lower substrate in an LC molecular layer (twist alignment state) as shown in FIG. 21 is readily developed rather than a state wherein LC molecules are aligned in parallel with each other in an LC molecular layer (parallel alignment state) as shown in FIG. 22. Such a twist alignment of LC molecules leads to various disadvantages for a display device such that the angle formed between the LC molecular axes in the first orientation state and the second orientation state (tilt angle) is apparently decreased to result in a decrease in contrast or light transmittance, and overshooting occurs in the response of the LC molecules at the time of switching between the orientation states to result in an observable fluctuation in light transmittance. For this reason, it is desired that the LC molecules are placed in the parallel alignment state for a display device.

SUMMARY OF THE INVENTION

The present invention has been accomplished to solve the above-mentioned problems and aims at providing a liquid crystal device improved in display characteristics by realizing the parallel alignment state of liquid crystal molecules.

We have observed that the above-mentioned twist alignment state can be transformed into the parallel alignment state by applying an appropriate alternating voltage (hereinafter sometimes represented by an AC voltage for parallel alignment) to a bistable ferroelectric liquid crystal.

According to the present invention, there is provided a ferroelectric liquid crystal device comprising a pair of substrates each provided with an electrode thereon, and a ferroelectric liquid crystal layer disposed between the substrates in a thickness which is thin enough to release the spiral structure of the ferroelectric liquid crystal, wherein the ferroelectric liquid crystal provides two average molecular axis directions forming an angle 2 ⊕ therebetween, each average molecular axis direction corresponding to one of two stable orientation states of the ferroelectric liquid crystal; the ferroelectric liquid crystal provides two average molecular axis directions forming an angle 2 ⊕ therebetween when voltages exceeding the threshold voltage of the ferroelectric liquid crystal are applied to the ferroelectric liquid crystal; and the ferroelectric liquid crystal provides two average molecular directions forming an angle $2\theta_a$ therebetween after applying an alternating electric field to the ferroelectric liquid crystal and removing the electric field; the angles $\theta$, ⊕ and $\theta_a$ satisfying the relationship of: $\theta < \theta_a \simeq$ ⊕ .

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic plan view illustrating an LC cell according to the present invention;

FIGS. 7, 10, 12, 15, 17 and 20 are respectively a circuit diagram of an example of the liquid crystal apparatus according to the present invention;

FIGS. 8 and 11 are circuit diagrams of switches used in the examples shown in FIGS. 7 and 10, respectively;

DESCRIPTION OF THE PREFERRED EMBODIMENTS

The liquid crystal materials most suited for the present invention are chiral smectic liquid crystals showing ferroelectricity. More specifically, liquid crystals showing chiral smectic C phase (SmC*), G phase (SmG*), F phase (SmF*), I phase (SmI*) or H phase (SmH*) are available.

Details of ferroelectric liquid crystals are described in, e.g., "LE JOURNAL DE PHYSIQUE LETTERS" 36 (L-69) 1975, "Ferroelectric Liquid Crystals"; "Applied Physics Letters" 36 (11) 1980, "Submicro Second Bistable Electrooptic Switching in Liquid Crystals"; "Kotai Butsuri (Solid State Physics)" 16 (141) 1981, "Liquid Crystals", etc. In the present invention, ferroelectric liquid crystals disclosed in these publications may be used.

Examples of ferroelectric liquid crystal compounds include decyloxybenzylidene-p'-amino-2-methylbutyl cinnamate (DOBAMBC), hexyloxybenzylidene-p'-amino-2-chloropropyl cinnamate (HOBACpC), 4-o-(2-methyl)-butylresorcylidene-4'-octylaniline (MBRA 8), etc. Especially preferred class of chiral smectic liquid crystals used in the liquid crystal device according to the present invention are those showing a cholesteric phase at a temperature higher than the temperature for giving a smectic phase. A specific example of such chiral smectic liquid crystal is a biphenyl ester type liquid crystal compound showing phase transition temperatures as shown in an example described hereinafter.

When a device is constructed using these materials, the device may be supported with a block of copper, etc., in which a heater is embedded in order to realize a temperature condition where the liquid crystal compounds assume a desired phase.

Figure 5:
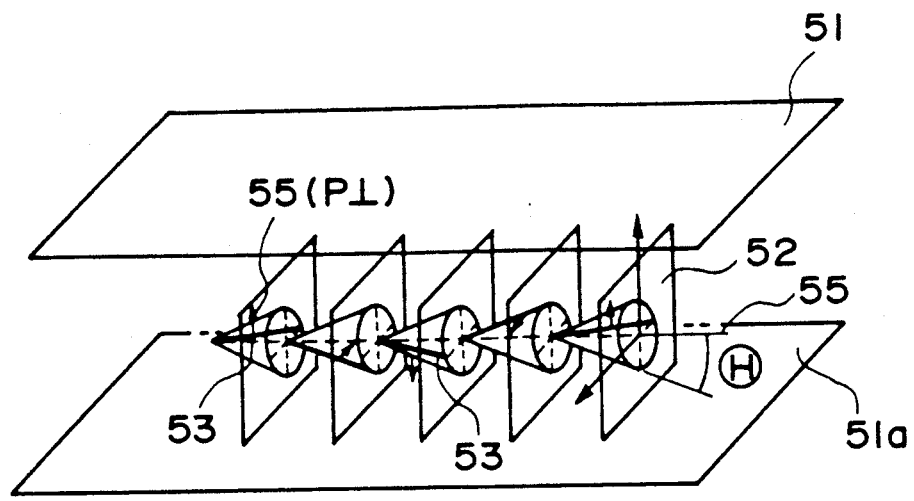
FIGS. 5 and 6 are respectively a schematic view for illustrating a ferroelectric liquid crystal cell.

Referring to FIG. 5, there is schematically shown an example of a ferroelectric liquid crystal cell for explanation of the operation thereof. An example where an SmC* phase constitutes a desired phase is explained. Reference numerals 51 and 51a denote base plates (glass plates) on which a transparent electrode of, e.g., In$_2$O$_3$, SnO$_2$, ITO (Indium-Tin-Oxide), etc., is disposed, respectively. A liquid crystal of an SmC*-phase in which liquid crystal molecular layers 52 are aligned perpendicular to surfaces of the glass plates is hermetically disposed therebetween. A full line 53 shows liquid crystal molecules. The liquid crystal molecules 53 continuously form a helical structure in the direction of extension of the base plates. The angle formed between the central axis 55 and the axis of a liquid crystal molecule 53 is expressed as Ⓗ. Each liquid crystal molecule 53 has a dipole moment (P$_\perp$) 54 in a direction perpendicular to the axis thereof. When a voltage higher than a certain threshold level is applied between electrodes formed on the base plates 51 and 51a, a helical structure of the liquid crystal molecule 53 is unwound or released to change the alignment direction of respective liquid crystal molecules 53 so that the dipole moments (P$_\perp$) 54 are all directed in the direction of the electric field. The liquid crystal molecules 53 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 6:
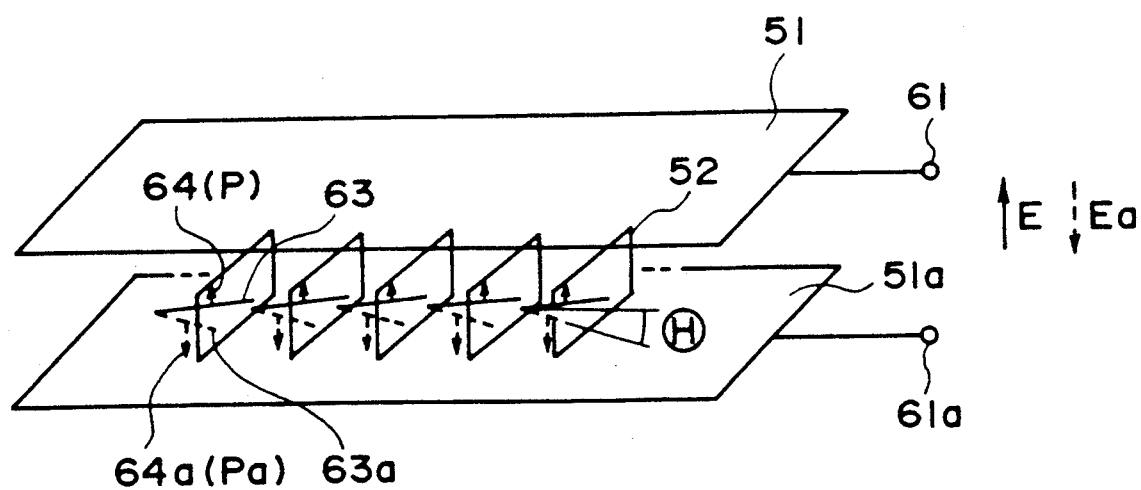

The liquid crystal layer in the liquid crystal device of the present invention may be rendered sufficiently thin in thickness (e.g., less than 10 $\mu$). As the thickness of the liquid crystal layer is decreased, the helical structure of the liquid crystal molecules is loosened even in the absence of an electric field whereby the dipole moment assumes either of the two states, i.e., P in an upper direction 64 or Pa in a lower direction 64a as shown in FIG. 6. One half of the angle between the molecular axis 63 and the molecular axis 63a is referred to as a tilt angle Ⓗ, which is the same as half the apical angle of the cone of the helical structure. When an electric field E or Ea higher than a certain threshold level and different from each other in polarity as shown in FIG. 6 is applied to a cell having the above-mentioned characteristics, the dipole moment is directed either in the upper direction 64 or in the lower direction 64a depending on the vector of the electric field E or Ea. In correspondence with this, the liquid crystal molecules are oriented in either of a first stable state 63 and a second stable state 63a.

When the above-mentioned ferroelectric liquid crystal is used as an optical modulation element, it is possible to obtain two advantages as briefly mentioned hereinbefore. Firstly the response speed is quite fast. Second by orientation of the liquid crystal shows bistability. The second advantage will be further explained, e.g., with reference to FIG. 6. When the electric field E is applied to the liquid crystal molecules, they are oriented in the first stable state 63. This state is stably retained even if the electric field is removed. On the other hand, when the electric field Ea of which direction is opposite to that of the electric field E is applied thereto, the liquid crystal molecules are oriented to the second stable state 63a, whereby the directions of molecules are changed. This state is similarly stably retained even if the electric field is removed. Further, as long as the magnitude of the electric field E or Ea being applied is not above a certain threshold value, the liquid crystal molecules are placed in the respective orientation states. In order to effectively realize high response speed and bistability, it is preferable that the thickness of the cell is as thin as possible.

The most serious problem encountered in forming a device using such a ferroelectric liquid crystal has been, as briefly mentioned hereinbefore, that it is difficult to form a cell having a highly uniform monodomain wherein liquid crystal layers having an SmC* phase are aligned perpendicular to the base plate faces and the liquid crystal molecules are aligned almost in parallel with the base plate faces.

There has been heretofore known a method of applying a uniaxial orientation treatment to base plate surfaces when a large area of a liquid crystal cell is produced. The uniaxial orientation treatment is effected by rubbing the base plate surfaces with velvet, cloth or paper in a single direction or by the oblique or tilt vapor deposition of SiO or SiO$_2$ onto the base plate surfaces. However, such a uniaxial orientation treatment as by the rubbing or the oblique vapor deposition has been considered inappropriate for a ferroelectric liquid crystal since such an orientation treatment per se hinders the bistability of the liquid crystal, based on which driving utilizing a memory characteristic is realized.

According to our further study, it has been found that it is possible to provide a specific bistable state as described hereinafter by applying a suitable uniaxial orientation treatment to base plate surfaces and by arranging a polarizer in the specific axis direction to realize driving while effectively utilizing a memory characteristic.

Figure 2:
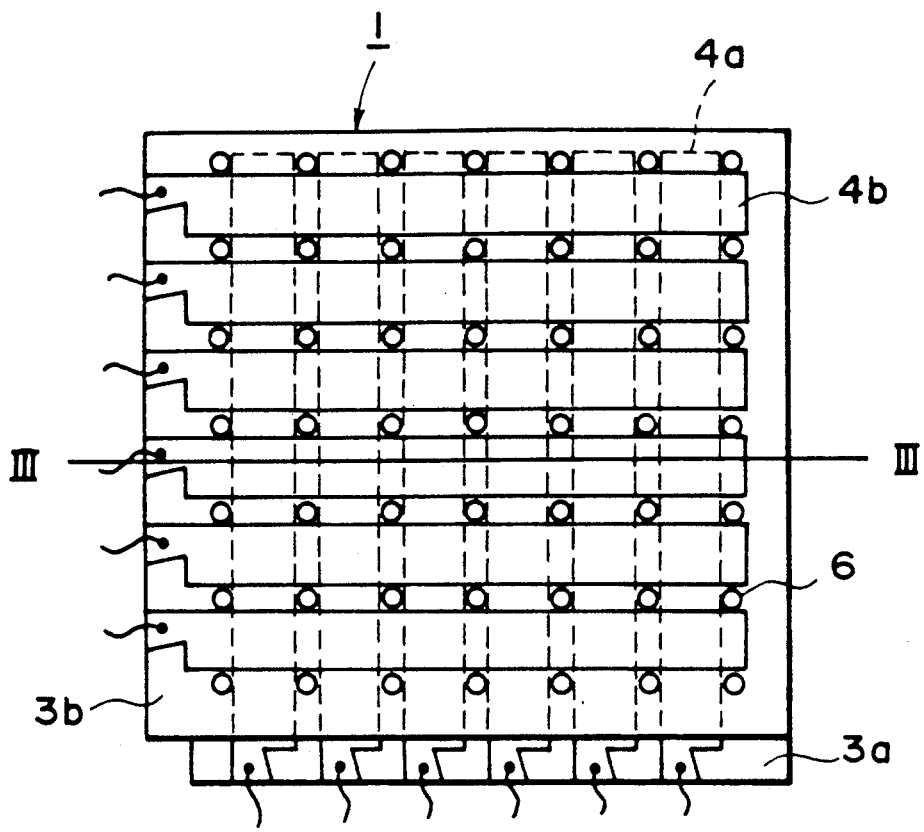
FIGS. 2 and 3 are a plan view and a sectional view, respectively, of an LC cell.

FIG. 1 is a schematic view illustrating molecular orientation states in a liquid crystal device according to the present invention. FIG. 2 is a plan view of an example of a liquid crystal cell used in the present invention and FIG. 3 is a sectional view of the cell taken along the line III—III shown in FIG. 2.

Figure 3:
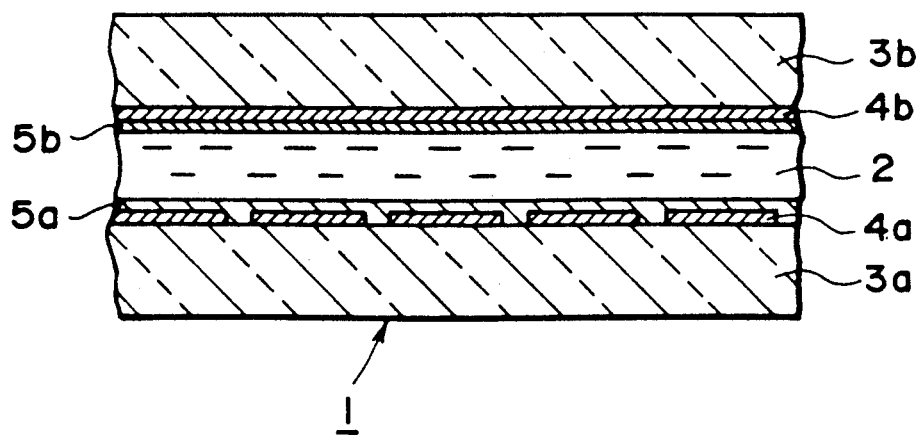

Referring to FIGS. 2 and 3, an LC cell 1 comprises a pair of substrates 3a and 3b of glass or a plastic, respectively provided thereon with stripe electrodes 4a and 4b of 1000 Å-thick ITO (Indium Tin Oxide) stripe electrode films and further thereon with alignment films 5a and 5b of 10 Å-1 μm, preferably 100 Å-5000 Å, in thickness. Between the alignment films are disposed polyimide spacers of 1 μ-dot shape so as to retain the liquid crystal layer 2 in a constant thickness over a wide area. The above mentioned two substrates, after being subjected to a rubbing treatment, are secured to each other to form a cell into which the liquid crystal is then introduced.

Hereinbelow, an example wherein an ester type liquid crystal mixture was used is explained with reference to FIGS. 1 through 3. The ester-type mixture liquid crystal showed the following phase transition temperatures as determined by microscopic observation:

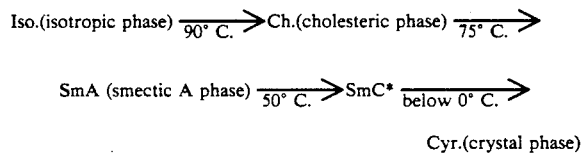

Cyr.(crystal phase)

When the liquid crystal layer was formed in a sufficiently large thickness (about 100 μ), the SmC* phase assumed a helical structure and the pitch was about 6 μ.

In the present invention, in order to realize the parallel alignment state, it is desirable that at least one of the alignment films 5a and 5b comprises a polymer film having a polarity term ($\gamma_b^p$) of 20 dyne/cm or below, preferably 10 dyne/cm or below, particularly preferably 7 dyne/cm or below.

According to our measurement, various polymer films usable as alignment films showed the following polarity terms:

| Film species | Polarity term ($\gamma_b^p$) |
| --- | --- |
| polyethylene | 2.6 dyne/cm |
| polyvinyl alcohol | 3.3 dyne/cm |
| Nylon 12 | 3.7 dyne/cm |
| Nylon 11 | 5.0 dyne/cm |
| Nylon 2001 | 7.2 dyne/cm |
| Nylon 3001 | 11.5 dyne/cm |
| polyimide* | 22.6 dyne/cm |

*The polyimide film was formed by a dehydro-ring closure reaction at 300° C. of a coating film of a polyamic acid which was a dehydro-condensation product of pyromellitic dianhydride and 4,4'-diaminodiphenyl ether.

The above-mentioned values of polarity terms are those measured according to a method described in Nippon Settyaku Kyokaishi (Journal of Adhesion Society of Japan) vol. 18, No. 3 (1972), pp. 131-141 under the conditions of a temperature of 20° C. and a relative humidity of 55%. The B-series liquids (containing no hydrogen bonding component or dispersion component) were 5 species of methylene iodide, tetrabromoethane, α-bromonaphthalene, tricresyl phosphate, and hexachlorobutadiene. The above values are respectively an average of measured values obtained with the five liquids.

Further, the above prepared 100 μ-thick cell gave a spontaneous polarization of 10 nC (nano-Coulomb)/cm² at 25° C. as measured by the triangular-wave application method (K. Miyasato et al., Japanese Journal of Applied Physics 22 (10), p.p. 661-663 (1983), "Direct Method with Triangular Waves for Measuring Spontaneous Polarization on Ferroelectric Liquid Crystal"). There is a tendency that the increase in tilt angle under the memory state by the AC application according to the present invention may be easily accomplished for a liquid crystal having a relatively large spontaneous polarization. For this reason, a ferroelectric liquid crystal having a spontaneous polarization at 25° C. of 5 nC/cm² or larger, particularly 10 nC/cm-300 nC/cm², is suited for the present invention. The values, however, can vary depending on the kinds of the alignment films.

The preparation procedure of a ferroelectric liquid crystal cell 1 as shown in FIGS. 2 and 3 is supplemented hereinbelow.

A cell structure 1 containing the above mentioned biphenyl ester type liquid crystal is set in such a heating case (not shown) that the whole cell 1 is uniformly heated therein. When the cell 1 is heated to a temperature (about 95° C.) where the liquid crystal in the cell assumes an isotropic phase. The temperature of the heating case is decreased whereby the liquid crystal in the cell 1 is subjected to a temperature decreasing stage. In the temperature decreasing stage, the liquid crystal in the isotropic phase is transformed at about 90° C. into a cholesteric phase having a grandjean texture and, on further cooling, is transformed from the cholesteric phase to an SmA phase which is a uniaxially anisotropic phase at about 75° C. At this time, the axes of the liquid crystal molecules in the SmA phase are aligned in the rubbing direction.

Then, the liquid crystal in the SmA phase is transformed into an SmC* phase on further cooling, whereby a monodomain of SmC* phase with a non-spiral structure is formed if the cell thickness is of the order of, for example, 3 μm or less.

Referring again to FIG. 1, the figure is a a schematic plan view illustrating the state of orientation of liquid crystal molecules as viewed from above the substrate face 15.

In the figure, double-hooded arrow 10 indicates a direction of a uniaxial orientation treatment, i.e., the direction of rubbing in this embodiment. In the SmA phase, liquid crystal molecules are oriented or aligned in an average molecular axis direction 11 which coincides with the rubbing direction 10. In the SmC* phase, the average molecular axis direction of the liquid crystal molecules is tilted to a direction 12, so that the rubbing direction 10 and the average molecular axis direction 12 forms an angle θ to result in a first stable orientation state. When a voltage is applied between a pair of base plates in this stage, the average molecular axis direction of the liquid crystal molecules in the SmC* phase is changed to a saturation angle Ⓗ larger than the angle θ, where a third stable orientation state is attained. The average molecular axis direction at this time is denoted by a reference numeral 13. When the voltage is then returned to zero, the liquid crystal molecules are returned to the former first molecular axis direction 12. Accordingly, the liquid crystal molecules have a memory characteristic in the state of the first molecular axis direction 12. When a voltage of the opposite polarity is applied in the state of the molecular axis direction 12 and the voltage is sufficiently high, the average molecular axis direction of the liquid crystal molecules is shifted to and saturated at a fourth stable orientation state giving an average molecular axis direction 13a. Then, when the voltage is returned to zero, the liquid crystal molecules are returned to and settled at the second stable state giving the average molecular axis direction 12a. As a result, when the polarizing direction 14 of one polarizer is set in the same direction as the molecular axis direction 12 forming the angle $\theta$, an optical contrast between an ON state and an OFF state can be improved in a driving method utilizing an orientation between the first and second stable orientation states and the memory characteristics.

The angle $\theta$ is detected as an average of the molecular axes in one stable state, and a reason for the angle $\theta$ being smaller than the angle ⊕ may be attributable to the fact that the liquid crystal molecules are not aligned or oriented in completely parallel with each other in an SmC* layer so that the average molecular axis orientation provides the angle $\theta$. It is considered possible in principle to have the angle $\theta$ be in concordance with the angle ⊕.

It is very effective to increase the value of $\theta$ for the purpose of transmittance of a liquid crystal device. More specifically, in a liquid crystal device utilizing the birefringence of a liquid crystal, a transmittance with right angle cross nicols is determined by the following equation:

$$I/I_0 = \sin^2 4\theta \cdot \sin^2(\Delta n d \pi / \lambda) \quad (1),$$

wherein $I_0$ denotes an incident light intensity, I a transmitted light intensity, $\theta$ a tilt angle, $\Delta n$ a refractive index anisotropy, d the thickness of a liquid crystal layer, and $\lambda$ the wavelength of an incident light. The above equation holds true with a case wherein one polarization axis of the right angle cross nicols is arranged to coincide with the average molecular axis direction in one stable state and the transmittance is obtained when the liquid crystal molecules are re-oriented to the other stable state, wherein the liquid crystal molecules are aligned in completely parallel with the substrate faces. It has been also confirmed, however, that the above equation also hold true with a case wherein the molecular axis directions providing the angle $\theta$ are nearly parallel with the substrate faces. As a result, the maximum transmittance is obtained at the tilt angle $\theta = 22.5°$.

According to the present invention, the liquid crystal molecules can be made to settle at two quasi-stable states giving the average molecular axis directions 12' and 12'a forming the angle $\theta$a, as depicted in FIG. 1, by applying an alternating current voltage to the ferroelectric liquid crystal and removing the electric field.

The measurement of the above-mentioned $\theta$, $\theta$a and ⊕ has been conducted in the following manner. A pair of polarizers are disposed in right angle cross nicols to sandwich a liquid crystal cell. A positive pulse exceeding the threshold voltage is applied across the cell, and the cross nicol polarizers are rotated with respect to the cell while retaining their relative positions to a position where the darkest state of the cell is reached. Then, a negative polarity pulse exceeding the threshold voltage is applied to the cell, and the cross nicol polarizers are again rotated until the darkest state of the cell is again reached. The rotation angles between the positions providing the two darkest states thus measured for the respective conditions correspond to twice the tilt angle $\theta$, $\theta$a and ⊕. Further to say, the tilt angles $\theta$ and $\theta$a are those in the memory state, so that they are measured after removal of the pulse voltages. On the other hand, the tilt angle ⊕ is measured while the pulse voltages are applied. Specific examples of actual measurement are explained hereinbelow.

EXAMPLE 1

Two cells having a cell thickness d of 1.1 μm and 1.8 μm, respectively, were prepared by using a polyimide film having a polarity term ($\gamma_{b}^{p}$) of 7.5 dyne/cm for both the alignment films 5a and 5b. The tilt angles $\theta$ were respectively measured at 8.0° and 7.5° which are both below the optimum value. Then, two polarities of pulses respectively of DC 50 volts were applied to the cells (d = 1.1 μm and d = 1.8 μm), whereby the tilt angle ⊕ were respectively measured at 23.1° and 24.0° which are close to the optimum value.

Further, switching between the bistable states was effected by using various magnitudes of voltage pulses in combination with various pulse durations with respect to the two cells, whereby the following swiching voltages were obtained.

TABLE 1

| Pulse duration (m · sec) | 1.5 | 1.0 | 0.5 |
|---|---|---|---|
| d = 1.1 (μm) | 10.1 V | 10.1 V | 10.1 V |
| d = 1.8 (μm) | 14.0 V | 14.0 V | 14.0 V |

Further, various AC voltages in the ranges of 10–150 V and 20–100 Hz were applied to the cells, and after the removal of the voltages, the tilt angle $\theta$a between the bistable states and the pulse duration - voltage characteristics of pulses for switching between bistable states were again examined.

When the AC voltages were applied for 10 seconds, the following results were obtained. The effective frequency range for increasing the tilt angle $\theta$ was 30–40 Hz and no noticeable difference in effectiveness was observed in this range. At the frequency of 40 Hz, no noticeable difference in tilt angle $\theta$a was observed in the range of 10–50 V, whereas in the range of 50–60 V, the domains of $\theta$a = 21.0° and $\theta$a = 18.8° began to appear for the all thickness of d = 1.1 μm and d = 1.8 μm, respectively. Further, in the range of 60–150 V, the domains developed entirely to provide a very good contrast. Over 150 V, however, the monodomains were disordered and other defects were also observed.

Switching voltages after the application of the voltage of 60–150 V were as shown in the following Table 2 for switching between the bistable states giving the tilt angle $\theta$a.

TABLE 2

| Pulse duration (m · sec) | 1.5 | 1.0 | 0.5 |
|---|---|---|---|
| d = 1.1 (μm) | 14.6 V | 16.1 V | 18.6 V |
| d = 1.8 (μm) | 16.9 V | 17.4 V | 21.1 V |

As is apparent from the above Table 2 in comparison with Table 1, the parallel alignment state giving the tilt angle $\theta$a required higher switching voltages than in the bistable state before the AC voltage application. This is because the tilt angle θa approached to ⊕, so that it was necessary to also apply an energy for inverting liquid crystal molecules in the vicinity of the alignment films and so inevitably increase the driving voltage for switching.

The transmittance given by the tilt angle θa after the AC voltage application increased to 14% for the cell thickness of d=1.1 μm and 19% for d=1.8 μm, which were nearly three times the values before the AC application.

EXAMPLE 2

The procedure of Example 1 was repeated except that polyvinyl films having a polarity term $\gamma_b^p$ of 3.3 dyne/cm were used in place of the polyimide films on the glass substrates and a cell thickness of d=1.5 μm was adopted. Essentially similar results were obtained, as follows.

Effective AC voltage: 45–70 V, 30–70 Hz
AC application time: 5–20 seconds
Tilt angle:
  Before AC voltage application θ=7.8°
  During DC voltage application ⊕ =22.8°
  After AC voltage application θa=21.6°
Switching voltages were as shown in the following Table 3.

TABLE 3

| Pulse duration (m - sec) | 1.5 | 1.0 | 0.5 |
|---|---|---|---|
| Voltage (V) | 16.2 | 17.0 | 21.4 |

The transmittance was 6% before the AC voltage application and 18%, i.e., three times, after the application.

EXAMPLE 3

As described hereinbefore, a ferroelectric liquid crystal phase having bistability is generally produced through temperature decrease from another higher temperature phase. In this example, the cells used in Examples 1 and 2 were cooled while applying thereto an AC electric field of 40 V and 50 Hz, whereby uniform monodomains of parallel alignment states were realized over a wide area.

EXAMPLE 4

Figure 4:
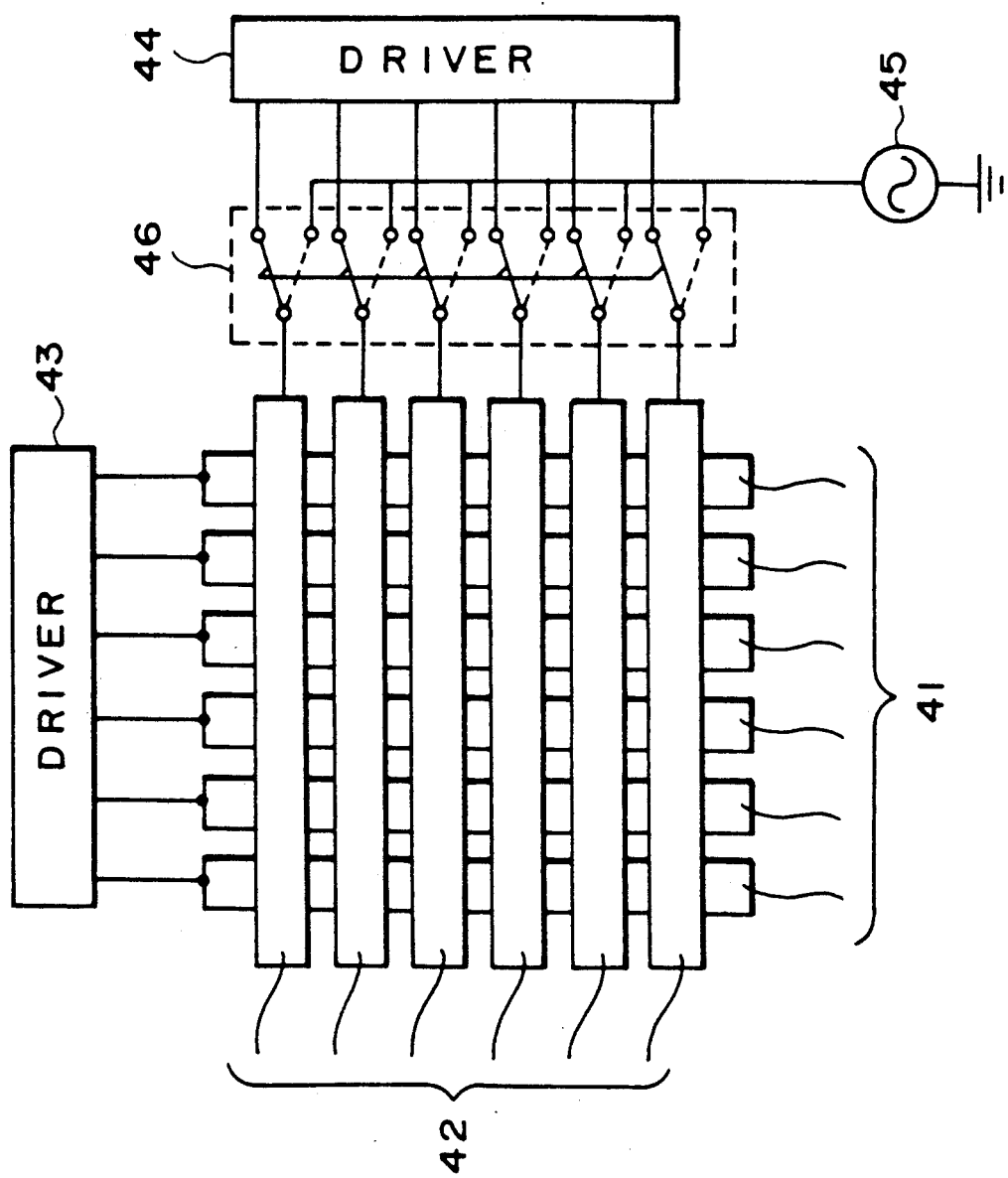
FIG. 4 is a circuit diagram for AC voltage application.

A cell which has been transformed into a parallel alignment state providing a high contrast due to application of an AC electric field can return to an original low contrast state after standing for several days. Accordingly, when a ferroelectric liquid crystal cell in a parallel alignment state providing a tilt angle θa is used for a display device, it is necessary and effective to apply an AC voltage to the cell before use thereof or when the contrast is lowered during use. FIG. 4 is a diagram for illustrating a peripheral circuit for the above-mentioned AC application. Referring to FIG. 4, transparent electrodes 41 and 42 formed on a pair of glass substrates for sandwiching a liquid crystal are disposed mutually at right angles to form picture elements in the form of a matrix. These electrodes 41 and 42 are connected to driver circuits 43 and 44, respectively, for applying voltages thereto. An AC voltage generator 45 is disposed selectively connectable to the electrodes 42.

More specifically, the driver circuit 42 and the AC voltage generator 45 are connected to the transparent electrodes through changeover switches 46. When the switches are closed to the driver circuit 44, image display signals are supplied to the electrodes 42, whereas when the switches are closed to the AC voltage generator 45, an AC voltage is simultaneously applied to all the electrodes 42. In this way, a ferroelectric liquid crystal is retained in the alignment state providing the tilt angle θa in the present invention.

On the other hand, the driver circuit 43 supplies a constant voltage, e.g., 0 volt, to all the electrodes 41.

EXAMPLE 5

Figure 7:
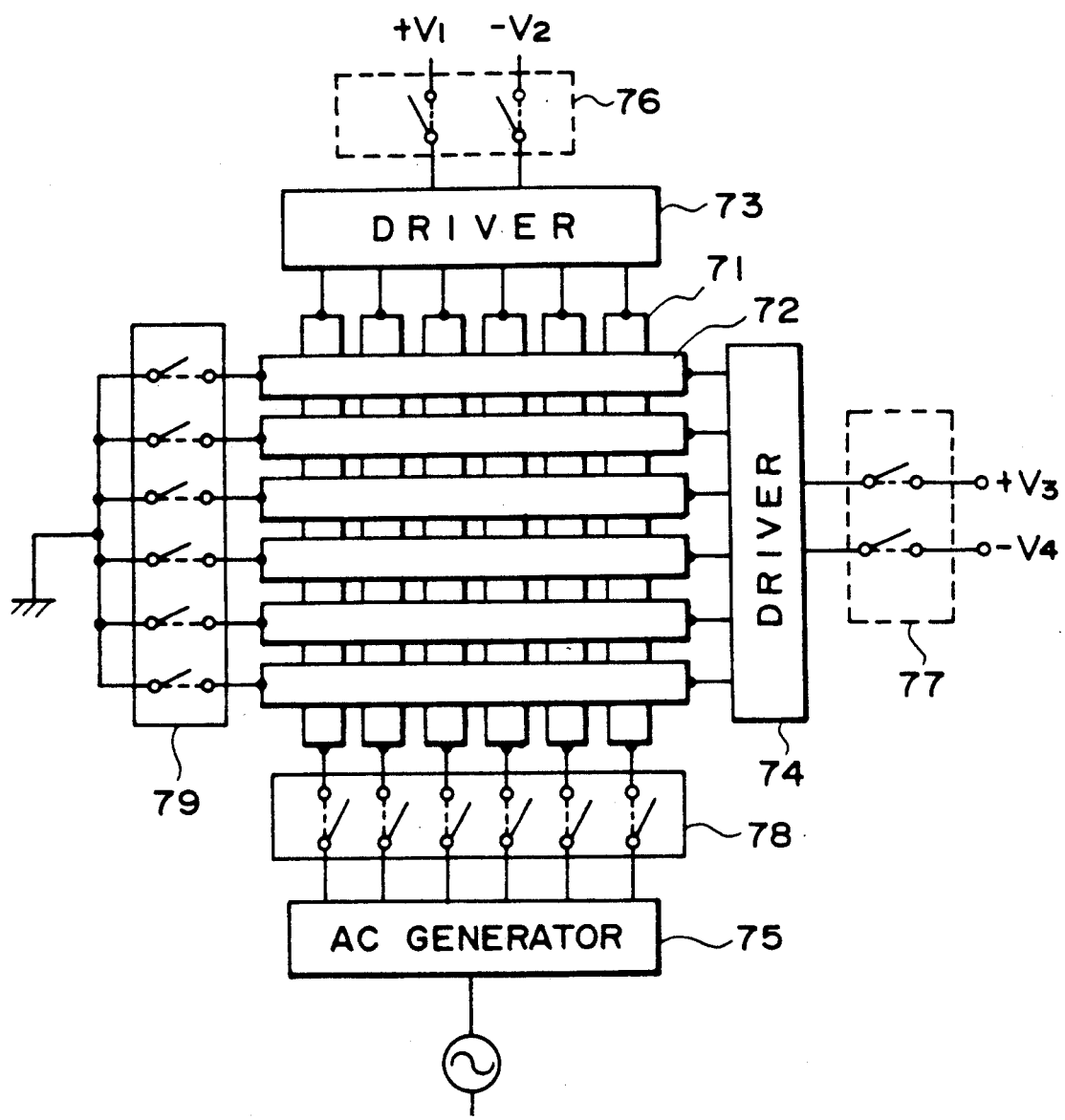

FIG. 7 shows another example of circuit for applying an AC voltage. Reference numerals 71 and 72 respectively denote transparent electrodes disposed mutually at right angles to form matrix picture elements and formed a pair of glass substrates sandwiching a liquid crystal. Numerals 73 and 74 respectively denote driver circuits for applying voltages to the electrodes, and 75 an AC voltage generator.

Switches 76, 77, 78 and 79 are selectively turned ON and OFF as required for AC application. When the picture elements are driven in a desired manner, the switches 76 and 77 are turned ON and the switches 78 and 79 are turned OFF.

When an AC electric field is applied for realizing the parallel alignment state, the switches 76 and 77 are turned OFF, and the switches 78 and 79 are turned ON. The switches 76 and 77 are turned OFF in order to protect the driver circuits 73 and 74. FIG. 8 illustrates a circuit example for one electrode line 71. Generally, the withstand voltage of a transistor is to a value of the order of a driving voltage. However, the AC voltage applied through a line 80 is required to be higher than an ordinary driving voltage.

For this reason, so as not apply a load exceeding the withstand voltage to transistors 81a and 81b, power supplies to the driver circuits 73 and 74 are disconnected by means of one switch 76a among the switched 76, whereby the driver circuits 73 and 74 are protected.

EXAMPLE 6

The liquid crystal apparatus used in Example 5 requires a rather complicated switching mechanism. In this example, in order to decrease the number of switches, a two-layer electrode structure is adopted.

Figure 9:
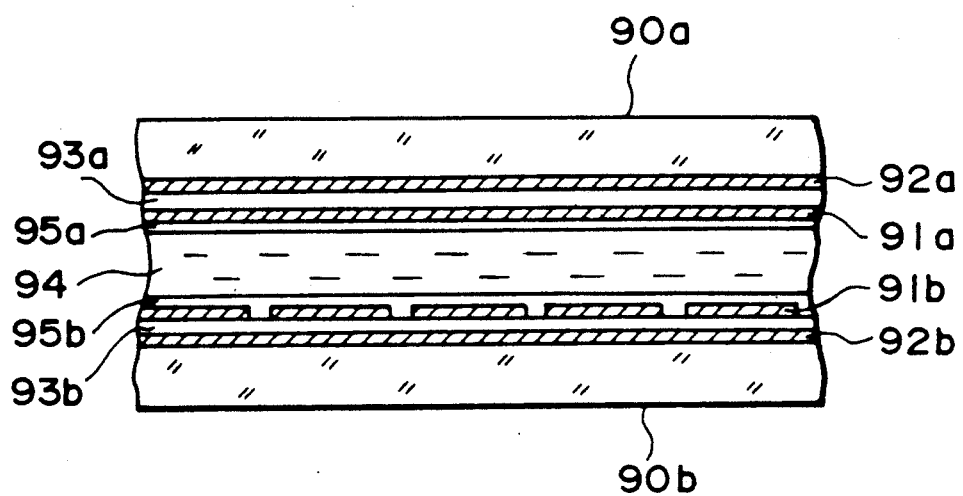
FIG. 9 is a sectional view showing another example of the LC device according to the present invention.
Figure 10:
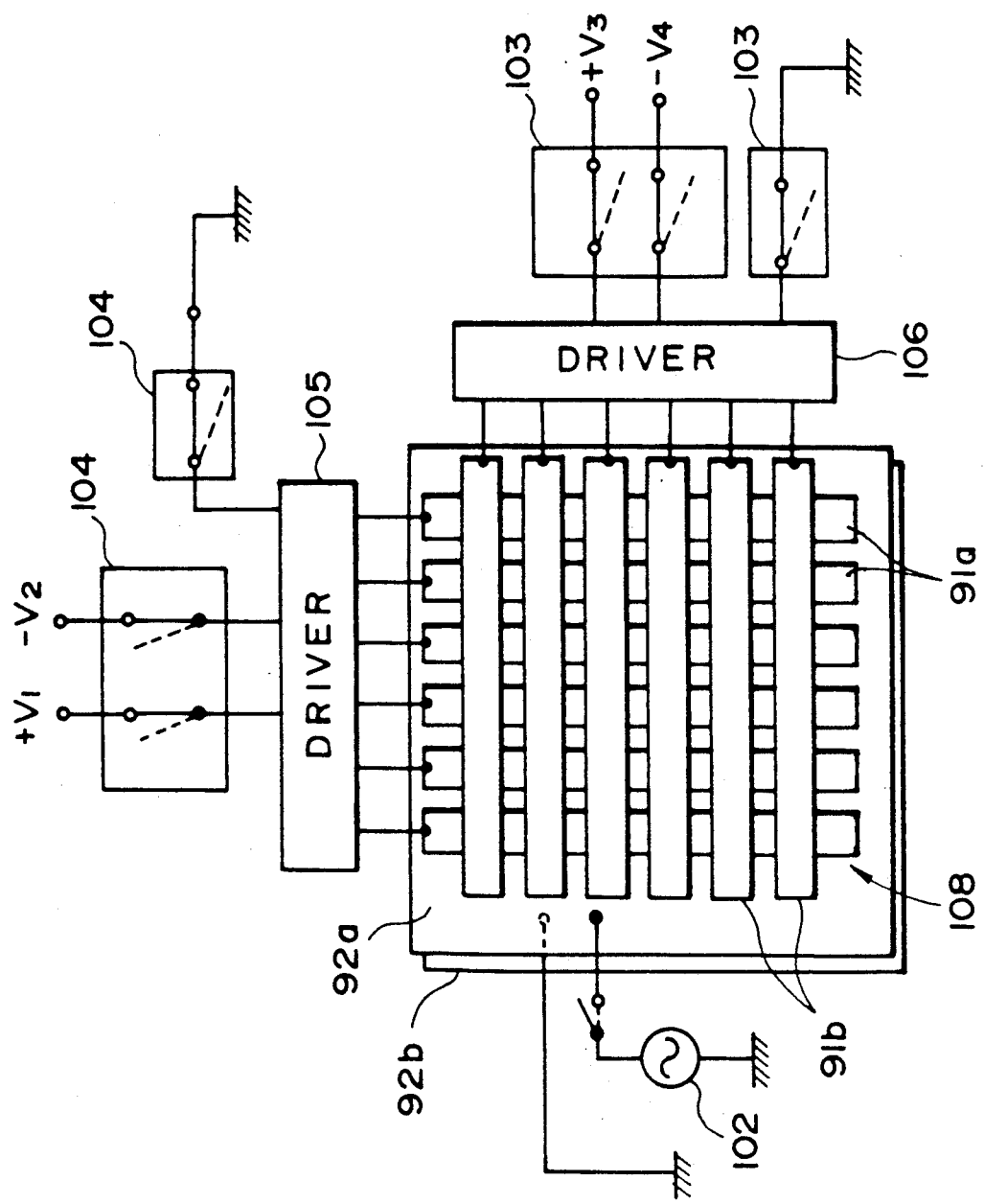

A sectional view for this arrangement is shown in FIG. 9, in which numerals 90a and 90b denote transparent substrates such as glass plates, 91a and 91b matrix electrodes, and 92a and 92b whole area electrodes covering the whole picture area. The whole area electrodes 92a and 92b are insulated from the matrix electrodes 91a and 91b by insulating films 93a and 93b. The circuit arrangement of a liquid crystal device having the two-layer electrode structure is shown in FIG. 10. The whole area electrodes 92a and 92b are disposed so as to sandwich the matrix electrodes 108 (combination of 91a and 91b). As in Example 5, at the time of driving, an AC application power supply 102 is turned OFF and switches 103 and 104 are turned ON. At the time of AC application, the switches 103 and 104 are turned OFF and the AC power supply 102 is turned ON. The switches 103 and 104 have a function of protecting driver circuits 105 and 106 from electrical damage and also a function of electrically floating the inner matrix electrodes 108 to effectively apply an AC field supplied from the whole area electrodes 92a and 92b outside the matrix electrodes to the inner SmC* liquid crystal layer.

FIG. 11 shows a driver circuit for one line used in this example. In order that the electric field applied from the whole area electrodes 92a and 92b outside the matrix electrodes 108 is effectively applied to the liquid crystal layer, it is necessary to place the matrix electrodes 108 by a switch 104a.

According to this example, the driver circuit corresponding to the number of lines can be turned OFF from the ground altogether by turning off the switch 104a, so that the switching mechanism can be simplified.

EXAMPLE 7

According to a system as shown in FIG. 12, driver circuits 121 and 122 can be completely isolated from matrix electrodes 126 by switches 123 and 124, so that the matrix electrodes are completely electrically floated at the time of applying a voltage to whole area electrodes. On the other hand, at the time of driving, the AC circuit 127 is turned OFF. According to this circuit arrangement, the driver circuits can be protected from electrical damage when a high voltage AC application is required.

EXAMPLES 8-11

Example 1 was substantially repeated while the polyimide films on the glass substrates were respectively replaced by polyethylene films (Example 8), Nylon 12 films (Example 9), Nylon 11 films (Example 10) and polyimide films (Example 11), and the cell thickness d was set to 1.5 μm. The tilt angles $\theta a$ for the respective cells after an AC application of 70 V and 70 Hz for 20 seconds. The results are summarized in the following table.

| Example | Alignment film ($\gamma_{t^p}$) | | Tilt angle $\theta a$ |
|---|---|---|---|
| 8 | polyethylene | (2.6 dyne/cm) | 20.0° |
| 9 | Nylon 2 | (3.7 dyne/cm) | 18.5° |
| 10 | Nylon 11 | (5.0 dyne/cm) | 18.0° |
| 11 | polyimide | (22.6 dyne/cm) | 8° |

Further, according to a preferred embodiment of the present invention, there is provided a liquid crystal apparatus comprising: a liquid crystal device comprising matrix electrodes including scanning signal lines and information signal lines spaced from and intersecting with each other, and a ferroelectric liquid crystal material disposed between the matrix electrodes; a scanning signal side liquid crystal driver circuit, and peripheral circuits thereof including a latch circuit and a shift register circuit; and an information signal side liquid crystal driver circuit and peripheral circuits including a latch circuit and a shift register circuit; wherein the liquid crystal driver circuits, the latch circuits and the shift register circuits are respectively of the same structure on the scanning signal side and the information signal side; and an alternating voltage is simultaneously applied to all the picture elements from at least one of the driver circuits.

In this embodiment, the AC voltage for parallel alignment is provided as a combination of signals from the scanning signal side driver circuit and the information signal side driver circuit having the same wave height and frequency and reverse phases. After the AC voltage application for parallel alignment, display signals corresponding to given image signals are applied.

In this embodiment, the output stage transistors constituting the scanning signal side driver circuit and the information signal side driver circuit are those having the same withstand voltage which is equal to or above the waveheight of the AC voltage for parallel alignment.

It is required that the AC voltage for parallel alignment is such that liquid crystal molecules can cause switching between bistable states while sufficiently responding thereto. The voltage waveheight thereof strongly depends on the kinds of liquid crystal material and alignment film used and the frequency, and may be adjusted to the same order as the waveheight of pulse voltages for switching.

Driver circuits and peripheral circuits thereof for a liquid crystal device in a matrix arrangement are made symmetrical. In other words, so-called vertical units and horizontal units of these circuits are made of the same construction. By this arrangement, one set of these may be used for the scanning signal lines and the other may be used for the information signal lines by only changeover switching, so that the vertical writing and horizontal writing can be easily switched. Furthermore, by similarly connecting two driver circuits to driving power supplies, it is possible to apply an AC voltage for parallel alignment from a driving power supply prior to writing pulses.

This embodiment is explained with reference to the drawings.

Figure 14:
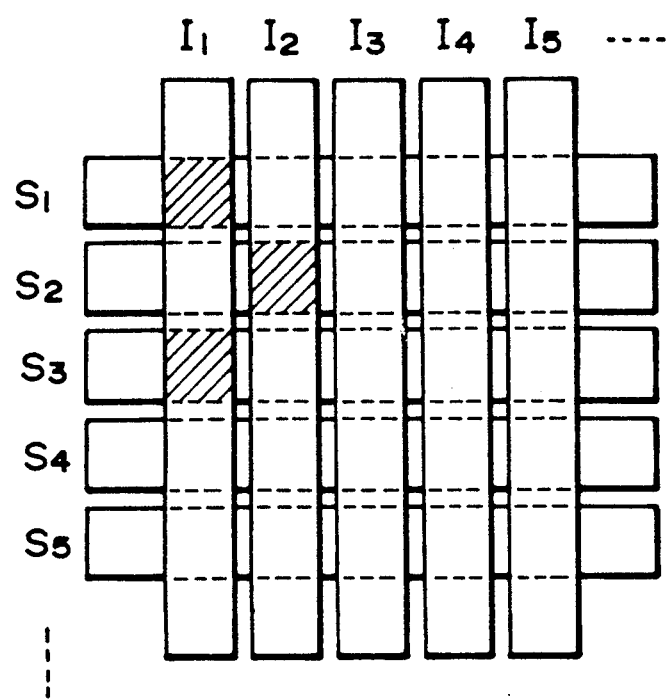
FIG. 14 is an illustration of matrix picture elements in an embodiment of the present invention.

FIG. 14 shows an electrode arrangement for a matrix display comprising scanning signal lines and information signal lines forming picture elements at respective intersections, and an example of display formed at the picture elements.

In FIG. 14, $S_1$-$S_5$ denote scanning signal lines and $I_1$-$I_5$ denote display signal lines. It is assumed that the hatched picture elements correspond to a "black" writing state and the white picture elements correspond to a "white" writing state.

Figure 13:
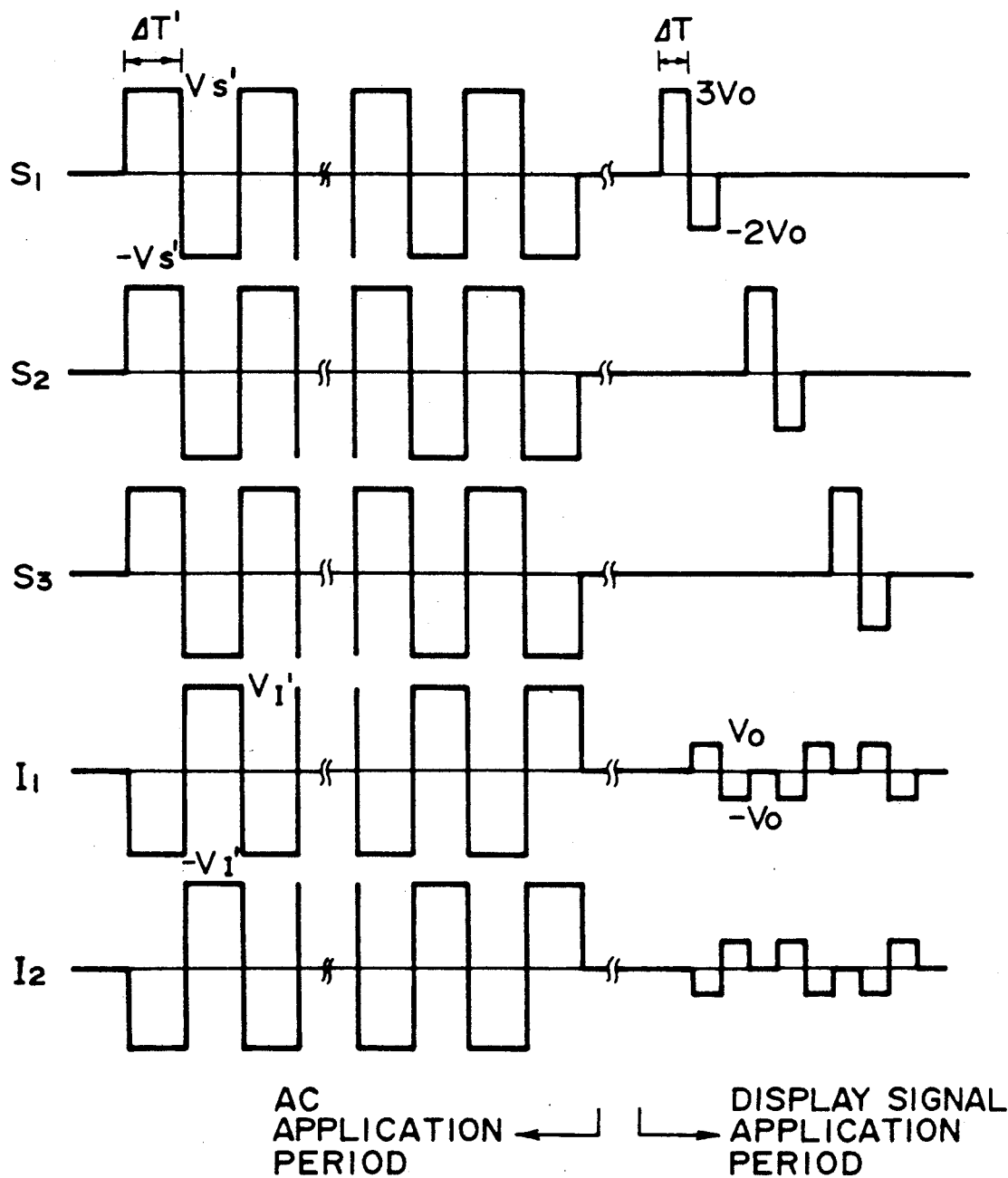
FIGS. 13 and 18 are respectively a timing chart for illustrating voltage signals used in an example of the present invention.

FIG. 13, especially at the display signal application period, shows a timing chart for forming a display state shown in FIG. 14 according to a line-sequential writing mode wherein the scanning signal lines $S_1$-$S_5$ are line-sequentially scanned and the columns of the information signal line $I_1$ and $I_2$ are alternately written in "white" and "black". In FIG. 13, $\Delta T$ denotes a writing pulse duration, and it is assumed that a positive electric field is used for writing "white" and a negative electric field is used for writing "black". It is also assumed that writing pulses are those having a pulse durations of $\Delta T$ and waveheights of $\pm 3 V_0$ exceeding the threshold.

More specifically, FIG. 13 corresponds to a scheme wherein picture elements on a scanning signal line are first written in "white" and selected picture elements on the scanning line are then written in "black" (line clear-line writing), and the information signal includes a writing signal and an auxiliary signal subsequent thereto for preventing a crosstalk caused by continuation of the same polarity of signals.

Immediately after energization of the driving circuits, as shown at the AC application period in FIG. 13, AC voltages for parallel alignment are simultaneously applied to all the scanning signal lines and the information signal lines with the same voltage heights V', with rectangular waves of the same frequency, but in antiphases.

As a result, a rectangular AC voltage of a waveheight 2 V' is applied across the substrates.

The AC voltage for parallel alignment is for transforming liquid crystal molecules from the twist state into the parallel state, and the waveheight and pulse duration thereof may be set to values respectively exceeding those of the writing pulses. In this example, a writing pulses of 1 msec and 10 V was used, whereas a rectangular AC voltage of 50 Hz and about 20 V (Vpp.) was applied for several seconds to realize the parallel alignment state.

The liquid crystal material used herein was a ferroelectric liquid crystal composition comprising, as the major components, p-n-octyloxybenzoic acid-p'-(2-methylbutyloxy)phenyl ester and p-n-nonyloxybenzoic acid-p'-(2-methylbutyloxy)phenyl ester. The liquid crystal cell was prepared by providing an alignment film of polyvinyl alcohol (PVA) on ITO pattern electrodes on a pair of glass substrates, followed by rubbing, and fixing to provide a cell thickness of about 1.5 $\mu$m. Between the transparent electrodes and the alignment films, insulating films of $SiO_2$ may be inserted.

Figure 15:
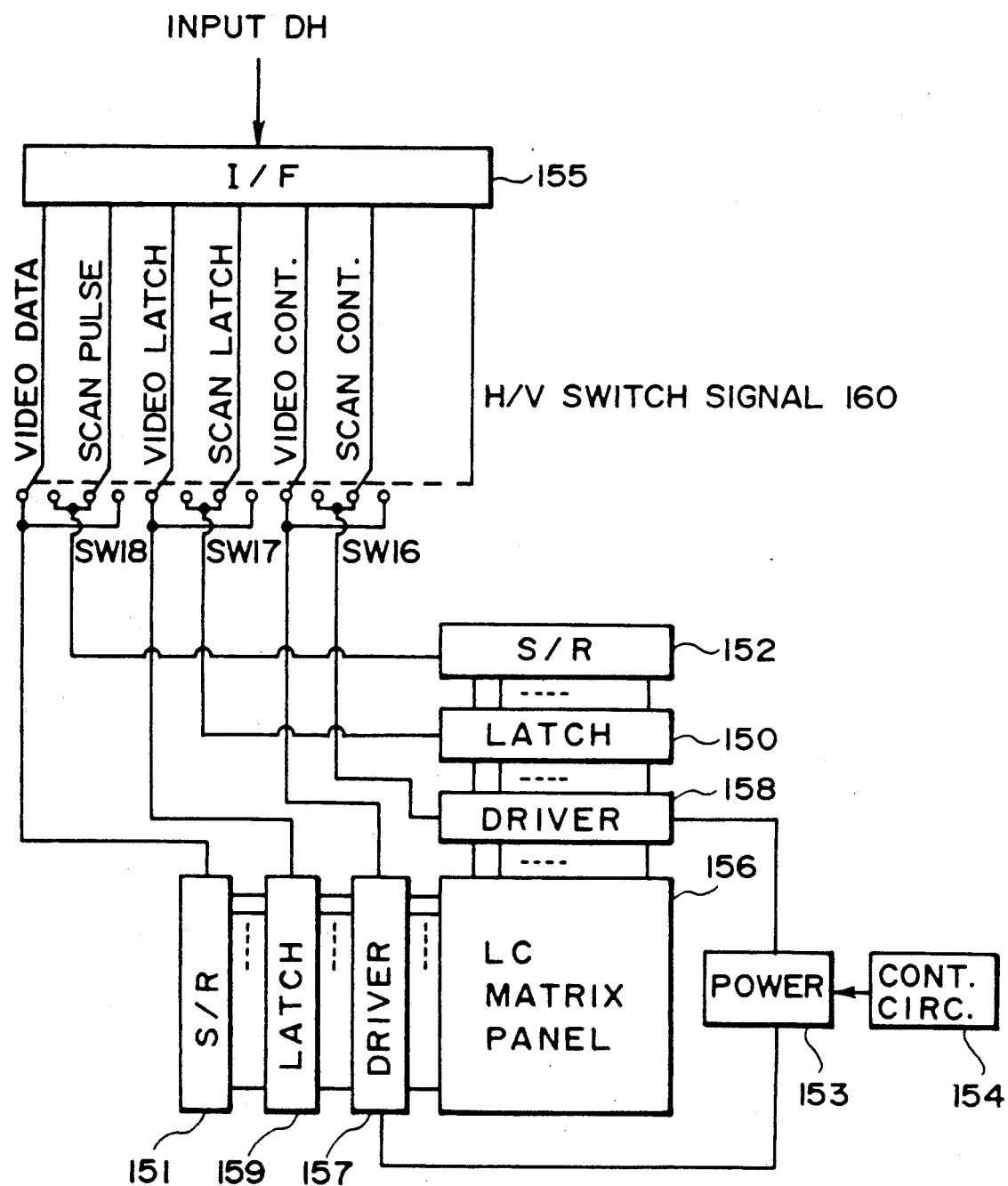

FIG. 15 shows a circuit arrangement for a liquid crystal apparatus according to the present invention. In FIG. 15, the same circuit arrangement is used for both the scanning signal side and the information signal side, wherein reference numeral 156 denotes a liquid crystal matrix panel, 157 an information signal side driver circuit, 158 a scanning signal side driver circuit, 159 and 150 latch circuits, 151 and 152 S/R (shift register) circuits, 153 a driving power supply, 154 a driving voltage control circuit, and 155 an I/F (interface).

In operation, when a main switch (not shown) is first turned on, an AC voltage of $V_S'$ is applied to all the scanning electrodes and an AC voltage of $V_I'$ of antiphases with $V_S'$ is applied to all the information signal electrodes respectively at a pulse duration of $\Delta T'$, so that a rectangular AC voltage of $V_{AC} = V_S' + V_I'$ (peak-to-peak) is applied across the upper and lower substrates as an AC voltage for parallel alignment. After this AC voltage is applied for a prescribed period to transform the liquid crystal molecules into a parallel alignment state, display driving signal voltages, i.e., a scanning signal voltage of 3 $V_0$ and $-2 V_0$ and an information signal voltage of $\pm V_0$ both having a pulse duration of $\Delta T$, are set by a driving voltage control circuit 154, and a multiplex driving is started depending on input signals DH.

Further, switching between the horizontal writing and the vertical writing may be easily effected by changing switches SW 16-18 depending on a H/V switching signal 160 to exchange the scanning signal side and the information signal side.

Figure 16:
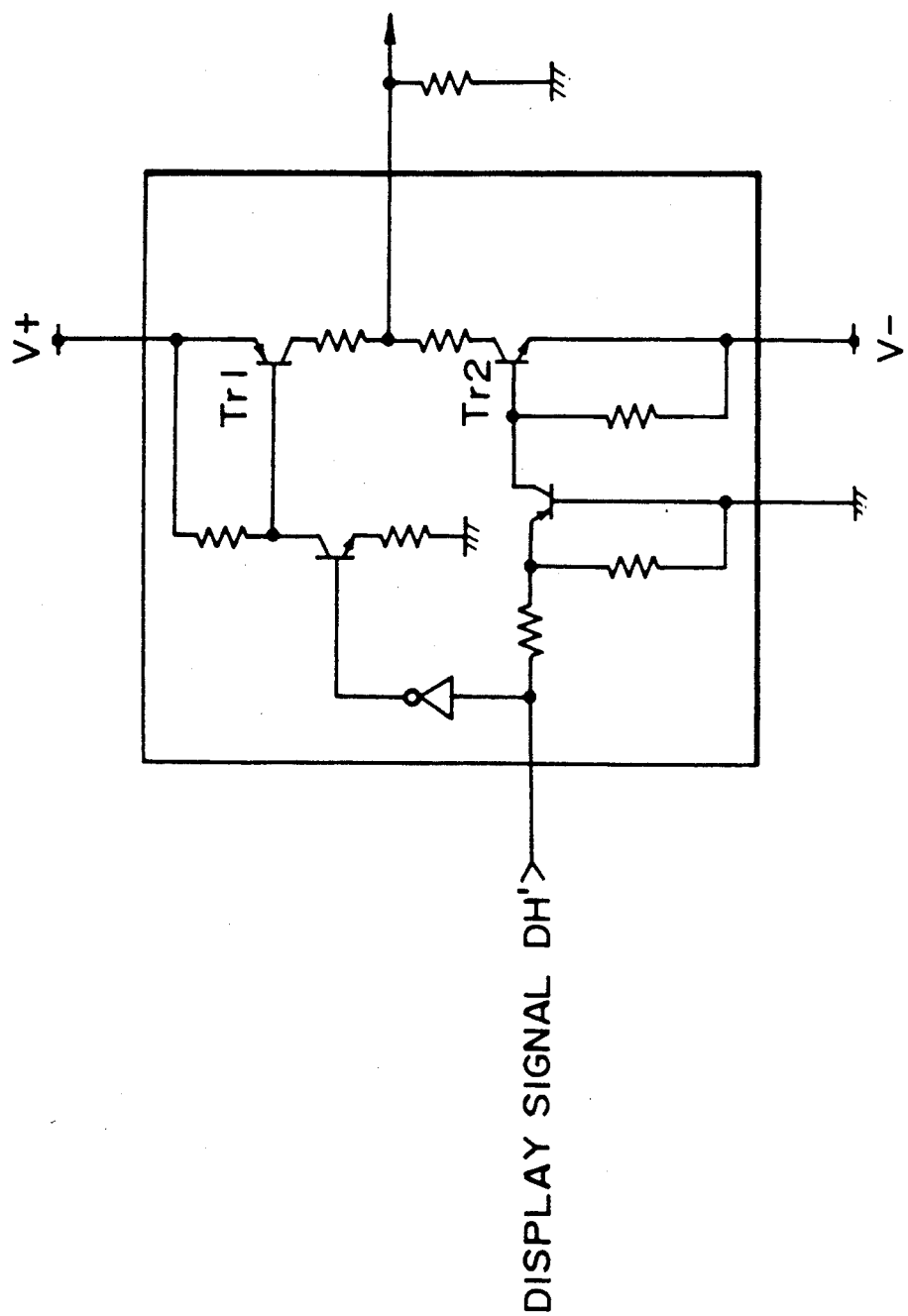
FIGS. 16 and 19 are circuit diagrams of the final stages of the driver circuits in the apparatus shown in FIGS. 15 and 17.

FIG. 16 shows a circuit structure at the final stage of the driver circuit 157 or 158 shown in FIG. 15. $Tr_1$ and $Tr_2$ denote output stage transistors. Referring to the driving waveform shown in FIG. 13, the withstand voltages Vc of the two output stage transistors are equally set to satisfy the following relationship:

$$Vc > V'(V_S', V_I') \geq V_O$$

Further, by appropriately selecting the liquid crystal material, the kind of the alignment film, and the frequency of the AC voltage for parallel alignment, it is possible in this embodiment to satisfy the following relationship.

$$Vc > V' \simeq V_O.$$

In any event, as the two driver circuits 157 and 158 are equally connected to the driving power supply 153, an AC voltage for parallel alignment having a waveheight and a pulse duration equal to or larger than those of the writing pulses as shown in FIG. 13 may be applied between $V_+$ and $V_-$ terminals shown in FIG. 16 prior to the input of a display signal DH' shown in FIG. 16 to accomplish the parallel alignment of the liquid crystal.

According to another preferred embodiment of the present invention, there is provided a liquid crystal apparatus comprising: a liquid crystal device comprising matrix electrodes including scanning signal lines and information signal lines spaced from and intersecting with each other, and a liquid crystal material disposed between the matrix electrodes, each intersection of the scanning signal lines and the information signal lines in combination with the liquid crystal material disposed therebetween constituting a picture element, a scanning signal side driver circuit, and an information signal side driver circuit; the liquid crystal apparatus being so constructed that an alternating voltage is applied to the whole picture elements prior to application of display signals according to a multiplex driving scheme.

In this embodiment, the application of display signals and the application of an AC voltage for parallel alignment are controlled by a common driving power supply circuit. The application of the AC voltage for parallel alignment may be effected by selecting either of the two methods, one of which comprises applying the AC voltage from either one of the scanning signal side driver circuit and the information signal side driver circuit and grounding the other side of signal lines all together during the AC voltage application period, and the other of which comprises AC voltages of mutually antiphases from the scanning signal side driver circuit and the information signal side driver circuit.

The AC voltage for parallel alignment may for example be a rectangular waveform of alternating polarities, the voltage waveheight of which may be set to a value higher than the voltage of display signals required for switching of the liquid crystal in the parallel alignment state.

Thus, according to this embodiment, liquid crystal driver circuits each connected to the scanning signal side and the information signal side are connected to a common driving power circuit, and the display signal voltages and the AC voltage for parallel alignment are applied from the driving power supply circuit. More specifically, prior to multiplex driving using display signals, an AC voltage of, e.g., rectangular pulses having desired waveheight and pulse duration is applied to preliminarily place the liquid crystal in a parallel alignment state, and then the liquid crystal driving for display is started.

Figure 17:
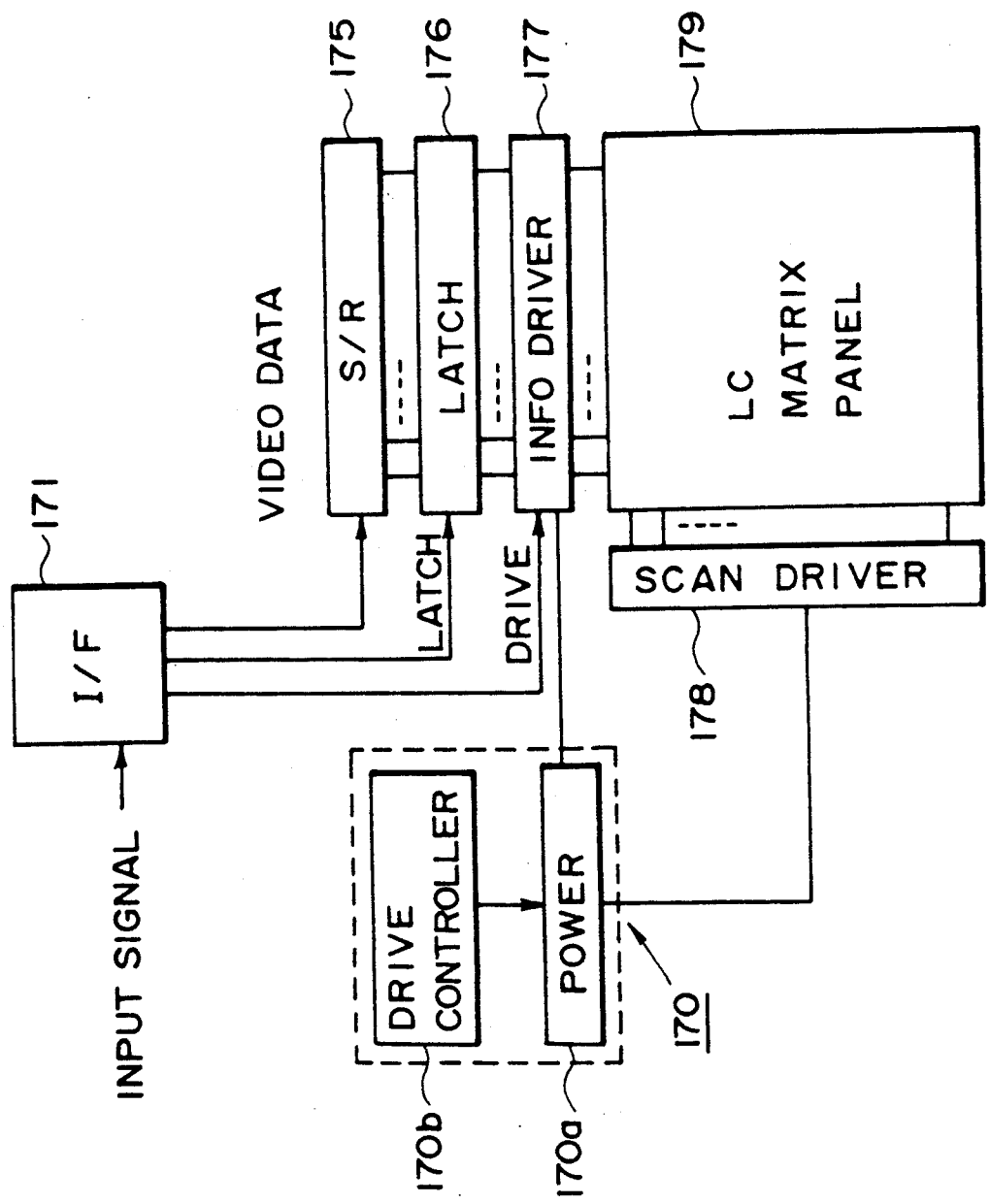
Figure 18:
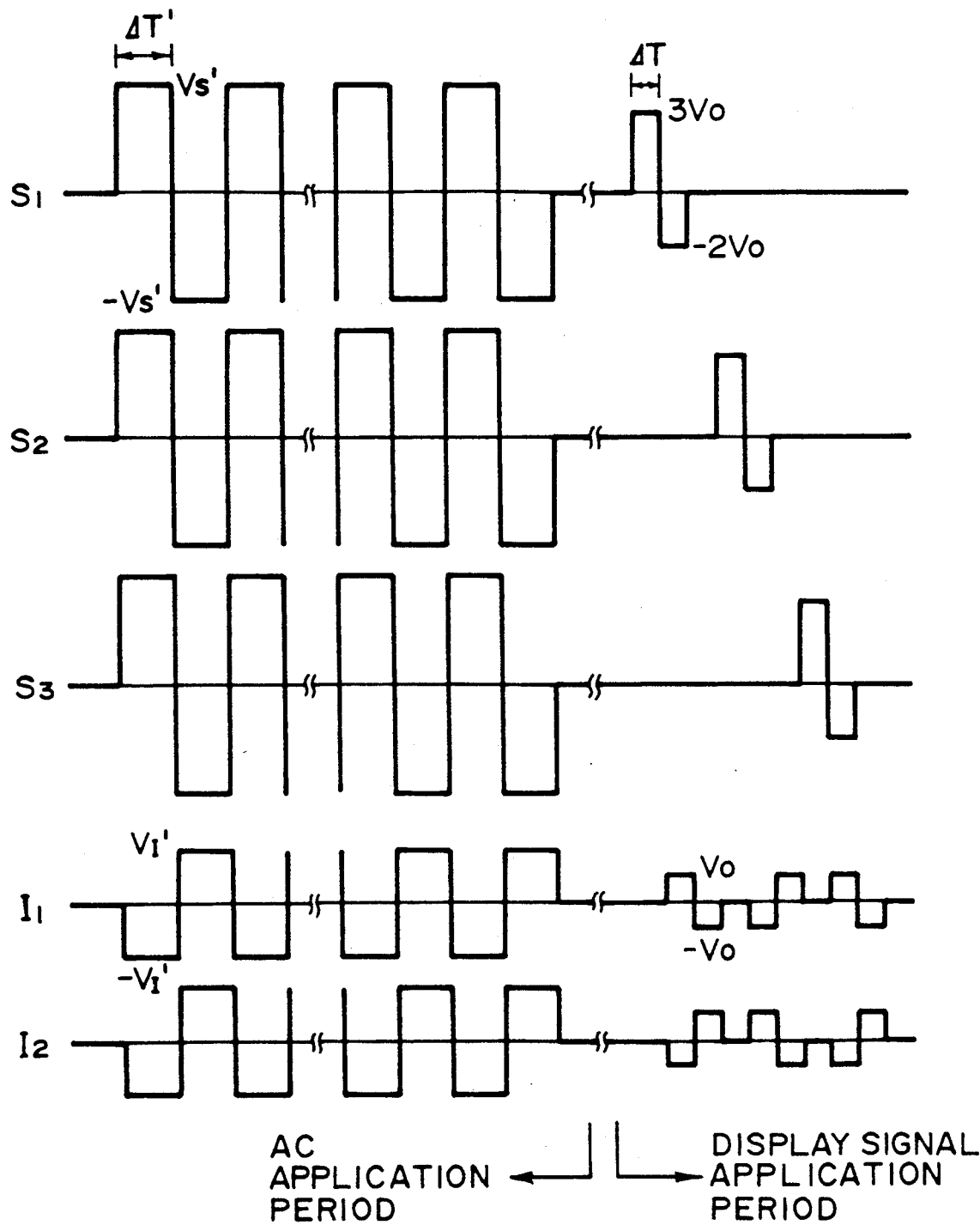

FIG. 17 shows an example of liquid crystal apparatus for supplying signal voltages as shown in FIG. 18.

In FIG. 17, reference numeral 171 denotes an interface (I/F), 175 denotes a shift register (S/R) circuit, 176 a latch circuit, 177 an information signal side driver circuit, 178 a scanning signal side driver circuit, and 179 an LC matrix panel. A driving power supply circuit 170 comprises a driving power supply 170a and a driving voltage control circuit 170b.

In operation, when a main switch (not shown) is first turned on, AC voltages for parallel alignment having waveheights $V_S'$ and $V_I'$ and a pulse duration $\Delta T'$ are applied in mutually antiphases to all the scanning electrodes and the information signal electrodes, respectively, so that a rectangular AC voltage of $V_{AC}$ (peak-to-peak)=$V_S'+V_I'$ is applied across the upper and lower substrates. After this AC voltage is applied for a prescribed period to transform the liquid crystal molecules into a parallel alignment state, display driving signal voltages, i.e., a scanning signal voltage of 3 $V_0$ and $-2 V_0$ and an information signal voltage of $\pm V_0$ both having a pulse duration of $\Delta T$, are set by a driving voltage control circuit 154, and a multiplex driving is started. The waveheights $V_S'$, $V_I'$ and the pulse duration $\Delta T'$ of the AC voltage for parallel alignment are larger than the waveheight 3 $V_0$, $V_0$ and the pulse duration $\Delta T$, respectively, of the writing pulses.

Figure 19:
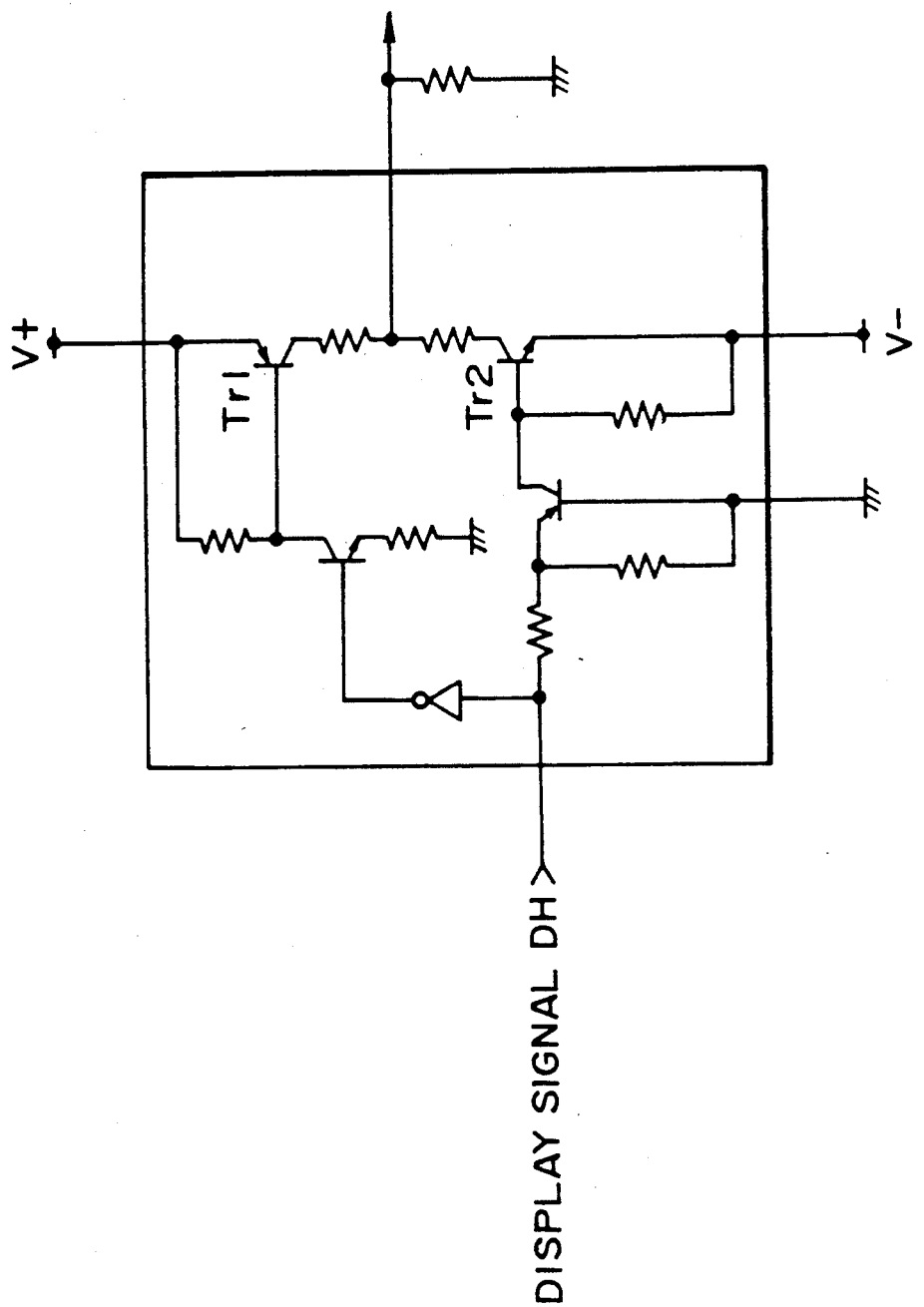

FIG. 19 shows a circuit structure at the final stage of the driver circuit 177 or 178 shown in FIG. 17. $Tr_1$ and $Tr_2$ denote output stage transistors. The withstand voltages of the two transistors are equally set, so that the withstand voltage $V_{SC}$ in the scanning signal side driver circuit 178 will satisfy $V_{SC}>V_S'$, and the withstand voltage $V_{IC}$ in the information signal side driver circuit will satisfy $V_{IC}>V_I'$, while referring to FIG. 17.

Further, when the AC voltage for parallel alignment is applied from either one of the scanning signal side driver circuit 178 and the information signal side driver circuit 179, the following conditions may be set:

$$V_{SC}>\tfrac{1}{2}V_{AC}, V_{IC}>V_0,$$

and the information signal side electrodes are grounded during the period for applying the AC voltage for parallel alignment, for example, when the AC voltage is supplied from the scanning signal side electrodes.

In this way, an AC voltage for parallel alignment which is a little lower than the withstand voltages $V_{SC}$ and $V_{IC}$ of the output stage transistors $Tr_1$ and $Tr_2$ shown in FIG. 19 may be applied between $V_+$ and $V_-$ terminals shown in FIG. 17 from the driving power supply circuit 170 prior to the multiplex driving using a display signal DH shown in the figure, thereby to accomplish the parallel alignment of the liquid crystal in advance.

Figure 20:
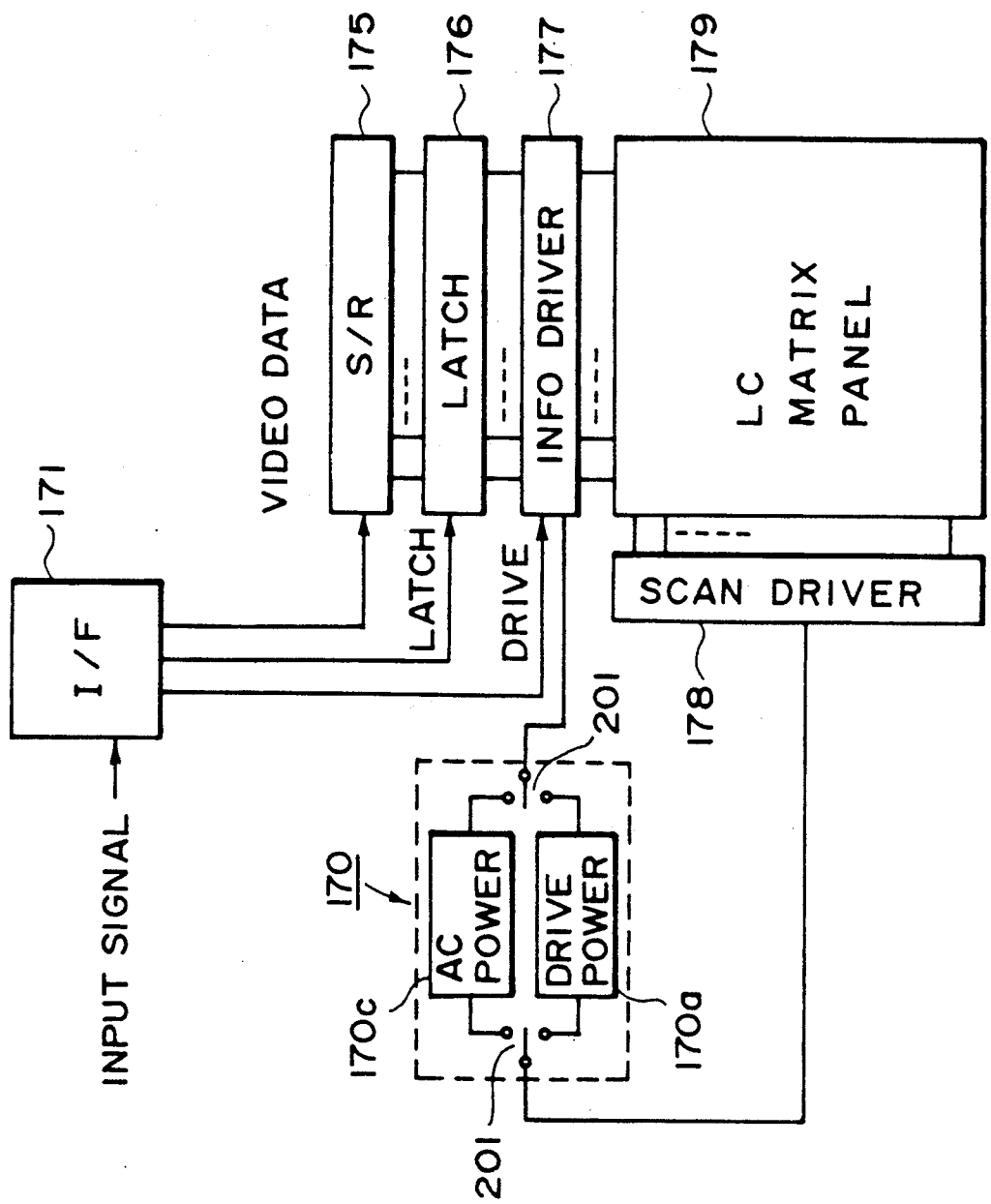

In this embodiment, a driving power supply for providing display signals and a power supply for providing an AC voltage for parallel alignment are made common. As shown in FIG. 20, however, separate power supplies may be disposed in combination with an appropriate changeover switch 201, so that an AC power supply 170c is connected when the main switch is turned on, and the switch 201 is changed over to the driving power supply 170a after a prescribed period.

The AC voltage for parallel alignment may be set to a value exceeding the threshold voltage of a ferroelectric liquid crystal used, preferably selected from the range of 10–500 V, particularly 20–500 V, in terms of a peak-to-peak voltage, and the frequency thereof may be 0.1 Hz or above, preferably in the range of 20 Hz–5 KHz. The period for application thereof may be 1 sec to 10 min, preferably 5 sec to 5 min.

The AC voltage may comprise continuous or intermittent pulses.

More specifically, the pulse duration of the pulse voltage used in the above mentioned pulse voltage application treatment may suitably be in the range of 1 $\mu$sec–10 msec, particularly 10 $\mu$sec–1 msec. Further, the pulse spacing may suitably be in the range of 1–100 times, particularly 2–50 times, the pulse duration.

The alternating voltage for pulse alignment has been explained with rather simple AC voltage signals but may comprise positive and negative components of unsymmetrical forms, i.e., with different waveheights (magnitudes) and pulse durations between the positive and negative components or pulses.

Figure 21:
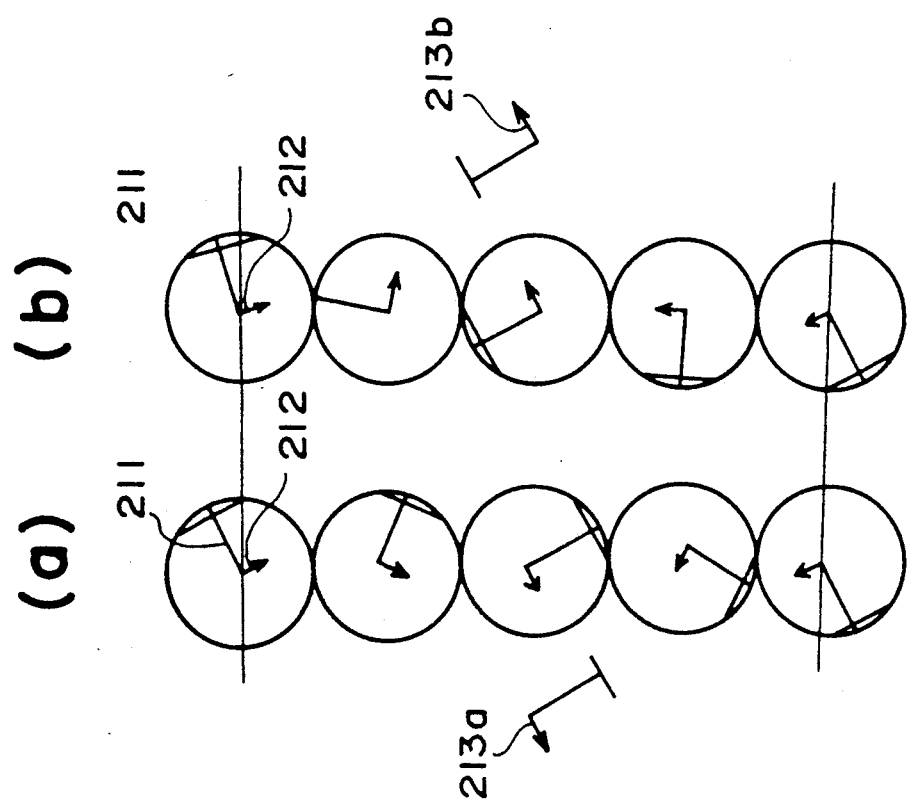

Some description is added to describe the microscopic internal structure of a chiral smectic ferroelectric liquid crystal layer. FIG. 21 is a schematic view of a section taken along a smectic molecular layer extending perpendicularly to the substrates of a liquid crystal cell wherein the spiral structure has been released to establish a bistability condition in a twist alignment, and illustrates the arrangement of C directors (molecular axes) 211 and corresponding spontaneous polarizations 212. The uppermost circles which correspond to the projection of a liquid crystal cone on the smectic molecular layer represent the states in the neighborhood of the upper substrate, while the lowermost circles represent the states in the neighborhood of the lower substrate. Referring to FIG. 21, the state at (a) provides an average spontaneous polarization 213a directed downward, and the state at (b) provides an average spontaneous polarization 213b directed upward. As a result, by applying different directions of electric field to the liquid crystal layer, switching between the states (a) and (b) is caused.

Figure 22:
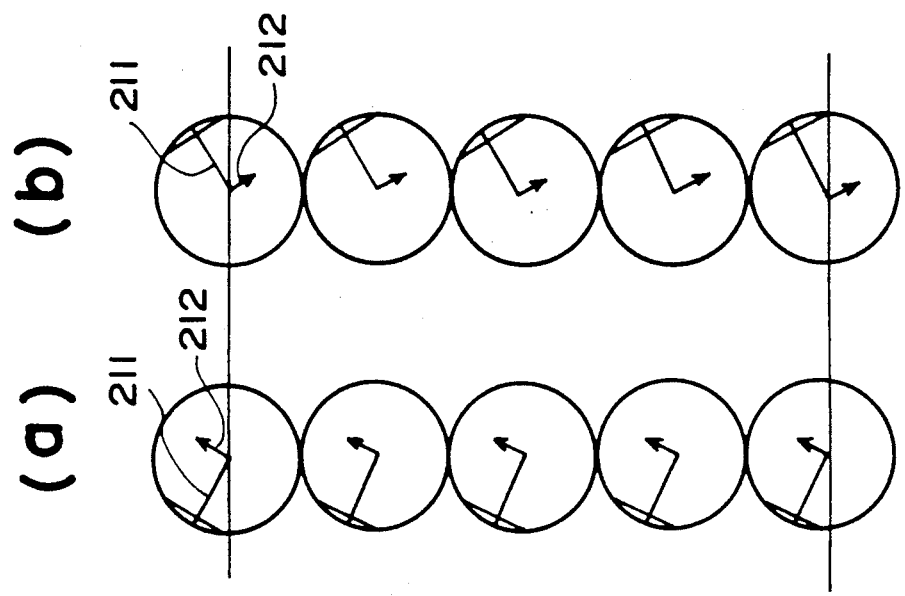
FIG. 21 and 22 are respectively a schematic view of projection of C directors on a chiral smectic molecular layer in a twist alignment state and in a parallel alignment state, respectively.

FIG. 22 is a schematic sectional view corresponding to FIG. 21 of a liquid crystal cell which is in an ideal parallel alignment state where no twisting of C directors 211 across the thickness of the liquid crystal cell is involved. The spontaneous polarization 211 is upward in the state at (a) and downward in the state at (b).

For the purpose of generalization, cases where C directors are somewhat tilted with respect to the substrate faces are shown in the figures.

As described hereinabove, according to the present invention, a high AC electric field is applied to a ferroelectric liquid crystal cell under bistability condition, whereby the tilt angle under the bistability condition after removal of the AC electric field is enlarged to increase the contrast of the cell. Also by cooling the cell while applying the high AC electric field to establish a bistability state, a wide tilt angle state is more uniformly obtained. Furthermore, by providing a ferroelectric liquid crystal apparatus with a high AC electric field-application circuit which is applicable to the apparatus on use, an apparatus which can resume a wide tilt angle state as desired may be obtained, so that a display apparatus or a shutter device rich in light transmittance and contrast and also having a high speed responsive characteristic, high picture element density and large area can be realized.

What is claimed is:

1. A liquid crystal apparatus, comprising:
a ferroelectric liquid crystal device comprising a pair of substrates which are each provided with an electrode thereon having a ferroelectric liquid crystal layer disposed between the pair of substrates, said liquid crystal layer being a thickness thin enough to release the spiral structure of the ferroelectric liquid crystal, wherein said ferroelectric liquid crystal provides two average molecular axis directions forming an angle 2$\theta$ therebetween, each average molecular axis direction corresponding to one of two stable orientation states of the ferroelectric liquid crystal; said ferroelectric liquid crystal providing two average molecular axis directions forming an angle 2⊕ therebetween when voltages exceeding the threshold voltage of the ferroelectric liquid crystal are applied to the ferroelectric liquid crystal; said ferroelectric liquid crystal also providing two average molecular directions forming an angle 2θa therebetween in the absence of an electric field after applying to said ferroelectric liquid crystal an alternating electric field having a waveheight and a pulse duration sufficient to cause switching between one and the other of said orientation states the angle θ, ⊕ and θa satisfying the relationship of: $\theta < \theta a \leq \oplus$ and means for applying the voltages exceeding the threshold voltage of the ferroelectric liquid crystal during a display operation period of the ferroelectric liquid crystal device and for applying the alternating electric field before the display operation period.

2. A ferroelectric liquid crystal apparatus according to claim 1, wherein said alternating electric field is applied between the pair of electrodes respectively formed on the pair of substrates.

3. A ferroelectric liquid crystal apparatus according to claim 1, wherein said alternating electric field exceeds the threshold voltage of the ferroelectric liquid crystal.

4. A ferroelectric liquid crystal apparatus according to claim 1, wherein said alternating electric field has a voltage of at least 10 volts and a frequency of at least 0.1 Hz.

5. A ferroelectric liquid crystal apparatus according to claim 1, wherein said alternating electric field has a voltage of 10-500 volts and a frequency of 20 Hz-5KHz.

6. A ferroelectric liquid crystal apparatus according to claim 1, wherein said alternating electric field is applied prior to application of driving voltages applied between the pair of electrodes.

7. A ferroelectric liquid crystal apparatus according to claim 1, wherein said alternating electric field is applied after interruption of application of driving voltages applied between the pair of electrodes.

8. A ferroelectric liquid crystal apparatus according to claim 1, wherein said alternating electric field is applied during cooling of the ferroelectric liquid crystal from a higher temperature phase.

9. A ferroelectric liquid crystal apparatus according to claim 1, wherein said ferroelectric liquid crystal has a spontaneous polarization of 5 nC/cm² or above at 25° C. as measured by the triangular-wave application method.

10. A ferroelectric liquid crystal apparatus according to claim 1, wherein said ferroelectric liquid crystal has a spontaneous polarization of 10-300 nC/cm² at 25° C. as measured by the triangular-wave application method.

11. A ferroelectric liquid crystal apparatus according to claim 1, wherein at least one of said pair of substrates is provided with an alignment film.

12. A ferroelectric liquid crystal apparatus according to claim 11, wherein said alignment film has a polarity term ($\gamma_b^p$) of 20 dyne/cm or less.

13. A ferroelectric liquid crystal apparatus according to claim 11, wherein said alignment film has a polarity term ($\gamma_b^p$) of 10 dyne/cm or less.

14. A ferroelectric liquid crystal apparatus according to claim 11, wherein said alignment film has a polarity term ($\gamma_b^p$) of 7 dyne/cm or less.

15. A ferroelectric liquid crystal apparatus according to claim 11, wherein said alignment film comprises polyimide, polyvinyl alcohol, polyethylene or nylon.

16. A ferroelectric liquid crystal apparatus according to claim 12, wherein said alignment film comprises polyvinyl alcohol.

17. A ferroelectric liquid crystal apparatus according to claim 12, wherein said alignment film comprises polyethylene.

18. A ferroelectric liquid crystal apparatus according to claim 12, wherein said alignment film comprises a nylon selected from the group consisting of 12, 11, 2001 and 3001.

19. A ferroelectric liquid crystal apparatus according to claim 14, wherein said alignment film comprises nylon 12 or 11.

20. A ferroelectric liquid crystal apparatus according to claim 11, wherein said alignment film has been subjected to a uniaxial orientation treatment.

21. A ferroelectric liquid crystal apparatus according to claim 20, wherein said uniaxial orientation treatment is a rubbing treatment.

22. A ferroelectric liquid crystal apparatus according to claim 1, wherein said alternating electric field comprises continuous or intermittent voltage pulse having a pulse duration of 1 μsec to 10 msec.

23. A ferroelectric liquid crystal apparatus according to claim 22, wherein said voltage pulse had a pulse spacing of 1-100 times the pulse duration.

24. A ferroelectric liquid crystal apparatus according to claim 1, wherein said ferroelectric liquid crystal is a chiral smectic liquid crystal.

25. A liquid crystal apparatus comprising:
  ferroelectric liquid crystal device matrix electrodes including scanning electrodes and signal electrodes spaced from and intersecting with each other, and a ferroelectric liquid crystal disposed between the scanning electrodes and the signal electrodes in a thickness which is thin enough to release the spiral structure of the ferroelectric liquid crystal; wherein said ferroelectric liquid crystal provides two average molecular axis directions forming an angle 2θ therebetween, each average molecular axis direction corresponding to one of two stable orientation states of the ferroelectric liquid crystal; said ferroelectric liquid crystal providing two average molecular axis directions forming an angle 2⊕ therebetween when voltages exceeding the threshold voltage of the ferroelectric liquid crystal are applied to the ferroelectric liquid crystal; said ferroelectric liquid crystal also providing two average molecular directions forming an angle 2θa therebetween in the absence of an electric field after applying to said ferroelectric liquid crystal an alternating electric field having a waveheight and a pulse duration sufficient to cause switching between one and the other of said orientation states; the angle θ, ⊕ and θa satisfying the relationship of: $\theta < \theta a \leq \oplus$ ;
  a driving circuit for applying a driving voltage selectively to the intersections of the scanning electrodes and the signal electrodes during a display operation period for the ferroelectric liquid crystal device; and a uniform electric field application circuit for applying said alternating electric field having a waveheight and a pulse duration sufficient to cause switching between one and the other orientation states to all or a prescribed part of the intersections, said alternating electric field being applied before the application of said driving voltage and before the display operation period.

26. A liquid crystal apparatus according to claim 25, wherein said driving voltage sand said alternating electric field are separately applied to the matrix electrodes.

27. A liquid crystal apparatus according to claim 25, comprising a pair of uniformly extending electrodes each being isolated from the matrix electrodes and extending over the whole intersections, wherein the driving voltage is applied between the matrix electrodes from the driving circuit, and the alternating electric field is applied between the pair of uniformly extending electrodes.

28. A liquid crystal apparatus according to claim 27, wherein said matrix electrodes are floated while the alternating electric field is applied from the uniform electric field application circuit.

29. A liquid crystal apparatus according to claim 25, wherein said ferroelectric liquid crystal is a chiral smectic liquid crystal.

* * * * *

UNITED STATES PATENT AND TRADEMARK OFFICE
CERTIFICATE OF CORRECTION

PATENT NO. : 5,013,137
DATED : May 7, 1991
INVENTOR(S) : AKIRA TSUBOYAMA, ET AL.　　　　　Page 1 of 3

It is certified that error appears in the above-identified patent and that said Letters Patent is hereby corrected as shown below:

On the Title page

IN [56] REFERENCES CITED

U.S. PATENT DOCUMENTS, "4,692,799　9/1987　Ando et al."
　　　　should read --4,692,779　9/1987　Ando et al.--.

OTHER PUBLICATIONS, Under J.M. Geary, "multipleted"
　　　　should read --Multiplexed--.

IN [57] ABSTRACT

Line 12, "angle 2 H" should read --angle 2 Ⓗ--.
　　Line 19, "H" should read --Ⓗ--.
　　Line 20, "H ." should read --Ⓗ.--.

COLUMN 2

Line 26, "Ⓗ" should read --θ--.
　　Line 38, "θ<$θ_a$=Ⓗ." should read --θ<$θ_a$≦Ⓗ.--.

COLUMN 3

Line 26, "(HOBACpC)," should read --(HOBACPC),--.

COLUMN 4

Line 30, "Second by" should read --Secondly, the--.

COLUMN 6

Line 20, "10 nC/cm" should read --10 $nC/cm^2$--.
　　Line 48, "a" (first occurrence) should be deleted.

UNITED STATES PATENT AND TRADEMARK OFFICE
CERTIFICATE OF CORRECTION

PATENT NO. : 5,013,137
DATED : May 7, 1991
INVENTOR(S) : AKIRA TSUBOYAMA, ET AL.

Page 2 of 3

It is certified that error appears in the above-identified patent and that said Letters Patent is hereby corrected as shown below:

COLUMN 6

Line 52, "double-hooded arrow 10" should read --double-headed arrow 10--.
    Line 61, "forms" should read --form--.

COLUMN 7

Line 24, "in" (first occurrence) should be deleted.
    Line 48, "in" should be deleted.

COLUMN 8

Line 23, "were" should read --was--.
    Line 24, "value." should read --values.--.

COLUMN 9

Line 65, "-disposed" should read --disposed--.

COLUMN 13

Line 8, "pulses" should read --pulse--.

COLUMN 14

Line 37, "mutually" should read --mutual--.

UNITED STATES PATENT AND TRADEMARK OFFICE
CERTIFICATE OF CORRECTION

PATENT NO. : 5,013,137
DATED : May 7, 1991
INVENTOR(S) : AKIRA TSUBOYAMA, ET AL.    Page 3 of 3

It is certified that error appears in the above-identified patent and that said Letters Patent is hereby corrected as shown below:

COLUMN 15

Line 2, "mutually" should read --mutual--.
    Line 34, "-is" should read --is--.

COLUMN 16

Line 50, "on" should read --in--.
    Line 66, "2θtherebetween" should read --2θ therebetween--.

COLUMN 17

Line 3, "angle 2" should read --angle 2 ⓗ--.
    Line 13, "states" should read --states;--.

Signed and Sealed this

Twenty-sixth Day of January, 1993

Attest:

STEPHEN G. KUNIN

*Attesting Officer*     *Acting Commissioner of Patents and Trademarks*